United States Patent
Doshi et al.

(10) Patent No.: US 7,609,637 B2
(45) Date of Patent: Oct. 27, 2009

(54) NETWORK QUALITY OF SERVICE MANAGEMENT

(75) Inventors: Bharat T. Doshi, Holmdel, NJ (US); Behrokh Samadi, Saratoga, CA (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 879 days.

(21) Appl. No.: 10/817,671

(22) Filed: Apr. 2, 2004

(65) Prior Publication Data
US 2005/0195741 A1   Sep. 8, 2005

Related U.S. Application Data

(60) Provisional application No. 60/549,818, filed on Mar. 3, 2004.

(51) Int. Cl.
*H04L 1/00* (2006.01)
(52) U.S. Cl. .......................... 370/235; 370/401
(58) Field of Classification Search ......... 370/229–238, 370/401
See application file for complete search history.

(56) References Cited

U.S. PATENT DOCUMENTS

| | | | | |
|---|---|---|---|---|
| 6,097,722 A * | 8/2000 | Graham et al. | ......... | 370/395.21 |
| 6,683,877 B1 * | 1/2004 | Gibbs et al. | ............... | 370/395.2 |
| 6,961,334 B1 * | 11/2005 | Kaczmarczyk | .............. | 370/354 |
| 6,980,517 B1 * | 12/2005 | Qureshi et al. | .............. | 370/235 |
| 7,068,659 B1 * | 6/2006 | Hamedani et al. | ........ | 370/395.2 |
| 7,088,677 B1 * | 8/2006 | Burst, Jr. | .................... | 370/229 |
| 7,133,417 B1 * | 11/2006 | Kao et al. | .................. | 370/467 |
| 7,248,682 B1 * | 7/2007 | Oran | .......................... | 370/352 |
| 7,480,283 B1 * | 1/2009 | Sylvain | ...................... | 370/352 |
| 2003/0123436 A1 * | 7/2003 | Joseph et al. | ............... | 370/352 |
| 2003/0128692 A1 * | 7/2003 | Mitsumori et al. | .......... | 370/352 |
| 2004/0047345 A1 * | 3/2004 | Joseph et al. | ............... | 370/352 |
| 2005/0073998 A1 * | 4/2005 | Zhu et al. | .................... | 370/352 |
| 2006/0072555 A1 * | 4/2006 | St. Hilaire et al. | .......... | 370/352 |

OTHER PUBLICATIONS

Steven Chamberland, "*An Efficient Heuristic for Designing Logical Overlay Networks for the Reliable Label Switched Paths in IP Networks*", Montreal (Quebec), Canada, 2002 IEEE, ISBN: 0-7803-7632-3, pp. 2089-2092.

* cited by examiner

*Primary Examiner*—Ricky Ngo
*Assistant Examiner*—Pao Sinkantarakorn
(74) *Attorney, Agent, or Firm*—Mendelsohn, Drucker & Associates, P.C.

(57) ABSTRACT

An architecture for quality-of-service (QoS) management creates a logical circuit-switched network within a packet network to support QoS-sensitive demands levied on the network. This QoS-managed network can serve to interwork, e.g., a PSTN with VoIP networks. The architecture can include a connection resource manager (CRM), which oversees bandwidth availability and demand admission/rejection on dynamically provisioned virtual trunk groups (VTGs) within the packet network, and a transport bandwidth controller (TBC). The VTGs serve to transport QoS-sensitive demands across the packet network. The TBC serves the CRM by providing an interface to routers and/or OAM systems of the packet network to size VTGs to meet QoS requirements. Media switches located at the packet network borders serve to mux/demux the demands into/from VTGs. CRMs and TBCs can be implemented as centralized, distributed, or hierarchical, and flat and aggregated variants of the architecture are supported. VTGs can be implemented using MPLS LSPs, VPNs, or source-based routing.

29 Claims, 9 Drawing Sheets

NETWORK QUALITY OF SERVICE MANAGEMENT

CROSS-REFERENCE TO RELATED APPLICATIONS

This application claims the benefit of the filing date of U.S. provisional application No. 60/549,818, filed on Mar. 3, 2004.

BACKGROUND OF THE INVENTION

1. Field of the Invention

The present invention relates to communications networks and, more specifically, to quality-of-service (QoS) management for QoS-sensitive services in communications networks, such as voice-over-Internet protocol (VoIP) services.

2. Description of the Related Art

Circuit-switched networks, such as the public switched telephone network (PSTN), utilize signaling to establish call connections along a path between a call's source and its destination. Each call connection uses a time slot on each link in its path and each switch maps a call from an input port and/or time slot to an output port and/or time slot. The selection of time slots and mappings happens during the call setup signaling. Once a call is established, these slots are dedicated to the call so there is no contention for resources after the call is set up. In other words, quality of service (QoS) during a call is guaranteed by dedicating resources during the entire call. If no slot is available on any one of the links to support a new call, then the call request is denied. Thus, one measure of QoS for the PSTN is the probability of denying a call request, also known as the blocking probability. Another measure of QoS is the time to get the dial tone and post-dial delay for setting up the call. Other important elements of QoS, including bounds on delay, jitter, and loss, are a natural result of the dedicated nature of the connections in a circuit-switched architecture.

Packet networks, on the other hand, do not dedicate resources to a "connection" and are thus subject to contention among connections. Many packet networks use best-effort techniques to support data "connections" and they typically fail to provide QoS guarantees in terms of bounds on delay, jitter, and loss. However, the prevalence of packet networks, such as Internet Protocol (IP)-based Internet and Intranets, and the desire to utilize a common technology or suite of technologies for data as well as voice and other QoS-sensitive services, have led to a need for QoS guarantees within packet networks. Packet networks, in particular best-effort IP networks, inherently suffer from variable delay, jitter, and loss that may violate some QoS requirements of QoS-sensitive applications. Signaling in packet networks, when employed, might address the notification of connection failure or congestion, but the signaling does not address comprehensive QoS management and efficient utilization of resources in providing guaranteed QoS services. IP routers, for example, typically will not reject new bandwidth requirements levied upon them, even if the routers are burdened beyond the bandwidth capacities of one or more outgoing links. For example, when best-effort IP networks carry voice services, accepted calls can experience degradation in QoS or even failure, and the accepted calls can degrade other calls that were already in progress.

SUMMARY OF THE INVENTION

As used herein, a demand is defined as a fundamental unit of a service, such as voice, which is characterized by a required bandwidth, a source, and a destination. A QoS-sensitive demand is a demand that is sensitive to certain network attributes, including packet throughput, delay, jitter, and loss. Examples of QoS-sensitive demands include voice calls and priority emails. Problems in the prior art are addressed, in accordance with principles of the present invention, by a method and apparatus for transporting quality-of-service (QoS)-sensitive demands across a packet network by overlaying a logical circuit-switched network onto the packet network. The logical circuit-switched network brings circuit-switched QoS, such as that exhibited by the public switched telephone network (PSTN), to the packet network while retaining the dynamic resource allocation flexibility and fast response times of the underlying packet network infrasture. The logical circuit-switched network provides transport for the QoS-sensitive demands across the packet network and can provide, for example, efficient and reliable transport of voice services over an Internet protocol (IP) packet network or an asynchronous transfer mode (ATM) network by guaranteeing bandwidth and providing upper bounds (e.g., guaranteed and probabilistic) on packet delay/jitter, and a guaranteed upper bound on packet loss ratio.

The present invention may be implemented through the use of a QoS management architecture for a packet network, such architecture including a connection resource manager that oversees bandwidth availability and demand admission/rejection on dynamically provisioned virtual trunk groups. Each virtual trunk group represents a path interconnecting two of the nodes of the packet network, possibly via one or more intermediate nodes. These virtual trunk groups serve to transport QoS-sensitive demands across the packet network. The QoS management architecture may additionally include a transport bandwidth controller that serves the connection resource manager by providing an interface to routers and/or operations and management systems of the packet network to dynamically provision, release, and change the size of the virtual trunk groups to efficiently meet the QoS requirements of the QoS-sensitive demands. The architecture can alternatively, or additionally, include media switches that multiplex and demultiplex the demands into and out of the virtual trunk groups. In such a logical circuit-switched overlay, media switches play a role analogous to voice-connection switches of the PSTN interconnected, in this case by virtual trunk groups, while routers play a role analogous to digital cross-connects of the PSTN.

The connection resource manager and transport bandwidth controller can each be implemented in centralized, distributed, or hierarchical configurations. The virtual trunk groups can be implemented using (i) label-switched paths in a multiprotocol label switched (MPLS) path network, (ii) virtual path network (VPN) protocols in a VPN/IP network, or (iii) source-based routing. Resource-reservation-protocol (RSVP)-type signaling or static provisioning using management systems can be used to create and reserve bandwidth for virtual trunk groups.

Border connection resource managers, border media switches, and concatenated virtual trunk group segments that are interconnected by border routers can be used to allow the logical circuit-switched network to span multiple technology and/or administrative domains.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
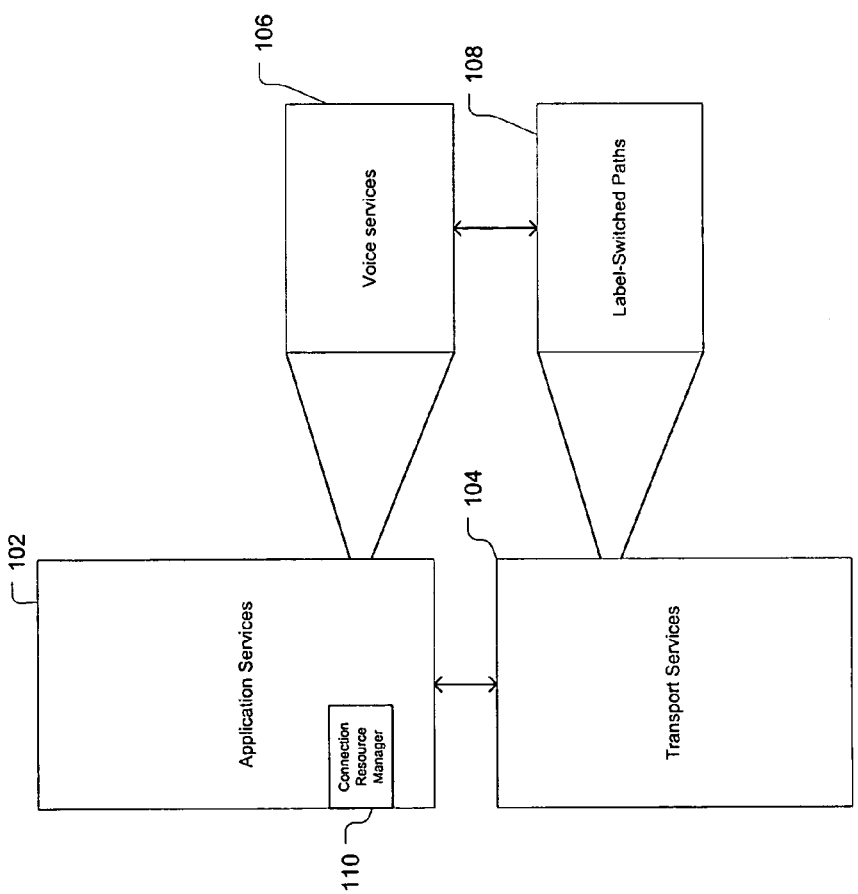
FIG. 1 illustrates the application and transport services layers, according to certain embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

Voice over IP (VoIP) has received much attention in recent years with the promise of lower cost, compared to circuit-switched telephony, made possible by the use of a common, high-capacity packet infrastructure for voice and other services. However, there are a few technical issues that have prevented large-scale deployment of VoIP services. One critical issue is the lack of end-to-end quality-of-service (QoS) mechanisms that ensure PSTN quality without excessive over-provisioning of bandwidth. Embodiments of the present invention provide what will be termed herein as absolute QoS (AQoS) where AQoS is defined as an engineered bound on call blocking and a quantitative packet level QoS guarantee for calls that are already in progress.

Embodiments of the present invention are based on observations of architectures and protocols as well as business models of PSTN and packet networks. They involve the provisioning of a set of virtual trunk groups (VTGs) within a packet network, where the VTGs have agreed-upon bandwidths and other service-level assurances (SLAs) from the underlying packet networks, similar to those provided by layer-one transport networks to the voice circuit-switching networks found in the present day PSTN. A VTG corresponds to a particular path between two nodes, where the path comprises at least one link and possibly one or more intermediate routers. Demands using a particular VTG all follow the same path through the network. When a network supports different possible paths between a source node and a destination node, it may be possible to define two or more different VTGs between those nodes, where at least two of the VTGs follow different paths through the network.

Embodiments of the present invention include a resource accounting-based call admission control (CAC) mechanism that keeps track of the number of calls in progress or the resources in use. The CAC mechanism can thereby accept/deny a new call set-up request depending on the resource availability of the VTGs in a call's path. The invention can be implemented using existing/emerging standards in IP networks such as DiffServ, RSVP, VPN, and MPLS, and within the context of present-day VoIP network elements that include softswitches, signaling gateways, media gateways, and edge routers. More information on DiffServ can be found in S. Blake, D. Black, M. Carlson, E. Davies, Z. Wang, W. Weiss, "An Architecture for Differentiated Services," RFC 2475, December 1998. More information on RSVP can be found in Braden, R., Zhang, L., Berson, S., Herzog, S., Jamin, S., "Resource ReSerVation Protocol (RSVP)— Version 1 Functional Specification," RFC 2205, September 1997. More information on VPN can be found in B. Gleeson, A. Lin, J. Heinanen, G. Armitage, A. Malis, "A Framework for IP Based Virtual Private Networks," RFC 2746, February 2000. More information on MPLS can be found in Rosen, E., et al., "Multiprotocol Label Switching Architecture," RFC 3031, January 2001. Each of these four references is incorporated herein by reference in its entirely.

Limitations of VoIP

Some of the technical issues associated with large-scale deployment of VoIP include the following:

1. Lack of end-to-end QoS mechanisms and operation/control structures precludes PSTN quality without excessive over-provisioning of the packet network,
2. Immature hardware and software in VoIP networks relative to the PSTN limits reliability/availability,
3. Significant effort is needed to duplicate the large embedded base of software for management, call control, signaling, supplemental services, intelligent network (IN), and other features that have been perfected over many years in PSTN, and
4. VoIP lacks support for the different business models common in PSTN.

As an example of item 4 above, the PSTN allows a voice service provider to lease all transmission facilities from another business entity and use its own voice switches. The business entity providing transmission facilities guarantees SLAs to the voice service provider. In fact, a multi-domain voice service provider may lease facilities from different operators for different domains.

Of course, PSTN also allows the same business entity to provide both the transmission facilities and voice switches. It also allows a service provider to only sell and bill for service while leasing the whole infrastructure from one or more operators.

The best effort packet network service does not allow the above client server model. Along with QoS capabilities, a successful VoIP service with business flexibility will require service level guarantees across domains and vertically between layers.

Features of PSTN Support in Packet Networks

Supporting a PSTN grade of voice service in a packet network may involve one or more of the following:
a. Global reach of PSTN and VoIP endpoints via multiple administrative domains,
b. Signaling mechanisms that support rich and flexible services,
c. Guarantee of PSTN-grade voice quality as measured by mean opinion scores (MOS),
d. Mechanisms to make sure that calls in progress are not adversely affected by new calls, e. Traffic/resource engineering to provide a bound (typically 0.1-1%) on the fraction of call-setup requests denied during the busiest time periods, and f. Hardware and software architecture of network elements, routing and alternate routing mechanisms, and network management to enable high service availability.

Given good codecs, feature (c) above can be met if the packet delay, jitter, and losses are kept sufficiently small in the packet network. Embodiments of the present invention provide a mechanism to meet at least features (c), (d), and (e) using a packet network.

Note that, recent and emerging standards provide some of the components that allow the present invention to be implemented and share the packet infrastructure with other services, thereby further reducing networks costs for service providers. The particular standards of interest for IP networks include IntServ, DiffServ, RSVP, IP tunnels, VPN, MPLS, and traffic engineering extensions of routing and signaling protocols. MPLS technology, particularly with the use and extensions of IP routing and fast layer-two forwarding of Label-Switched Paths (LSPs) and support for constraint-based routing and traffic engineering, is used in various embodiments of the present invention to support end-to-end AQoS. Finally, emerging MPLS standards, which support very fast restoration of LSPs in the event of network failures, are employed in certain embodiments to offer increased availability and reliability.

Embodiments of the present invention are based on the observation that a packet network can be used to support a set of virtual trunk groups. These VTGs, provisioned for specific bandwidths and other service-level assurances, provide transport services to a voice-service layer within the network architecture. This is analogous to how layer-one private networks (e.g., T1/E1s, T3/E3s, OC3s, and STM1s) provide transport to the circuit-switched voice networks as sets of trunk groups (voice-service multiplexes). A resource-accounting mechanism in the voice-service layer keeps track of the number of calls in progress, their resource needs, and resources allocated on each VTG. Knowing the capacity and usage of each VTG, this accounting process enables the network to allow or deny a new call set-up request depending on whether or not all VTGs in the new call's path can accommodate the new call without causing a QoS violation. Note that IP and MPLS networks support various kinds of virtual private networks (VPNs). Under embodiments of the present invention, these VPNs are extended to include QoS features that support higher-layer services, that, for example, meet VoIP with AQoS requirements.

Some of the aforementioned concepts are illustrated by FIG. 1, which shows a two-level hierarchy that includes application services layer 102 and transport services layer 104. One exemplary type of application services (e.g., voice services 106) is illustrated along with an exemplary type of transport services (e.g., label-switched paths 108) that support the applications services. A connection resource manager (CRM) CE provides accounting, resource management, and call admission control at the application services layer but it can be supported by enhancements to elements of the packet network.

The bandwidth allocated for VTGs is such that the fraction of calls denied (blocking probability) during busy periods is below some specified level (typically 0.1-1.0%). Since some packet networks can offer bandwidth on demand, VTGs can be made much more dynamic than traditional trunk groups in circuit-switched networks where the underlying transport networks offer bandwidth through static provisioning. This dynamic re-provisioning capability in embodiments of the present invention also implies that the traffic engineering needed to size the VTGs can be fine-tuned more frequently as a function of performance measurements.

Embodiments of the present invention build upon U.S. Pat. No. 6,529,499, incorporated herein by reference in its entirety, adding novel functional elements and providing for the use of dynamic and automated control, more efficient use of resources, and improved scalability, among other features.

Figure 2:
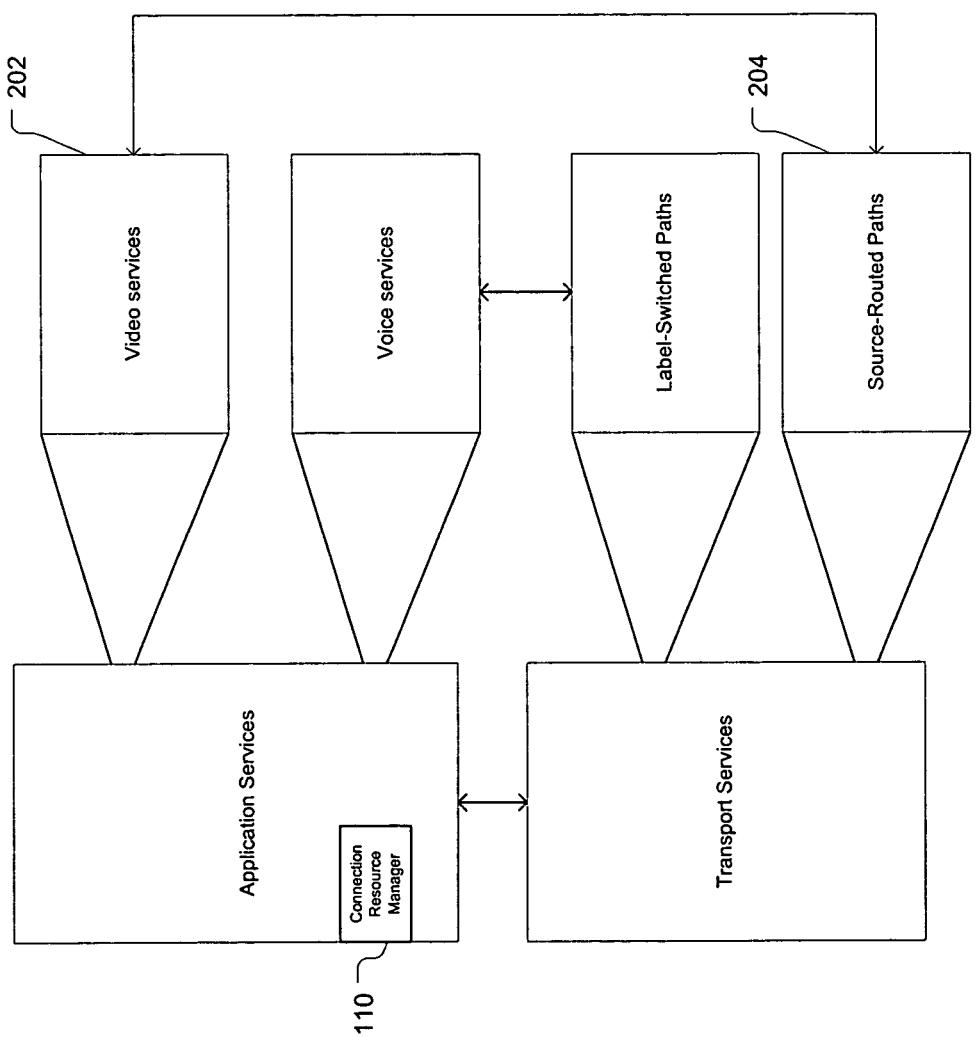
FIG. 2 illustrates additional examples of application and transport services, according to certain embodiments of the present invention.

FIG. 2 illustrates yet another type of application services (e.g., video services 202) being supported by an additional type of transport services (e.g., MPLS paths in IP networks 204) where accounting, resource management, and video service admission/rejection is also managed by CRM 110. In alternative embodiments, functions of the applications services layer (notably the CRM) and the transport services layer can be intermingled in common hardware and software. Such functional partitioning may depend on various system-design principles including bandwidth efficiency and manufacturability.

VoIP Networks and Services

In embodiments of the present invention, a layered architecture is used where a voice/multimedia call and connection service is distinguished from the underlying packet transport network to insure extensibility and flexibility. While the invention is discussed in terms of voice applications, it should be clear that the proposed architecture extends to the support of any application with well-defined QoS requirements and traffic profiles, including multimedia applications such as video broadcast, videoconferencing, on-demand information services, and guaranteed-throughput file and email services.

Figure 3:
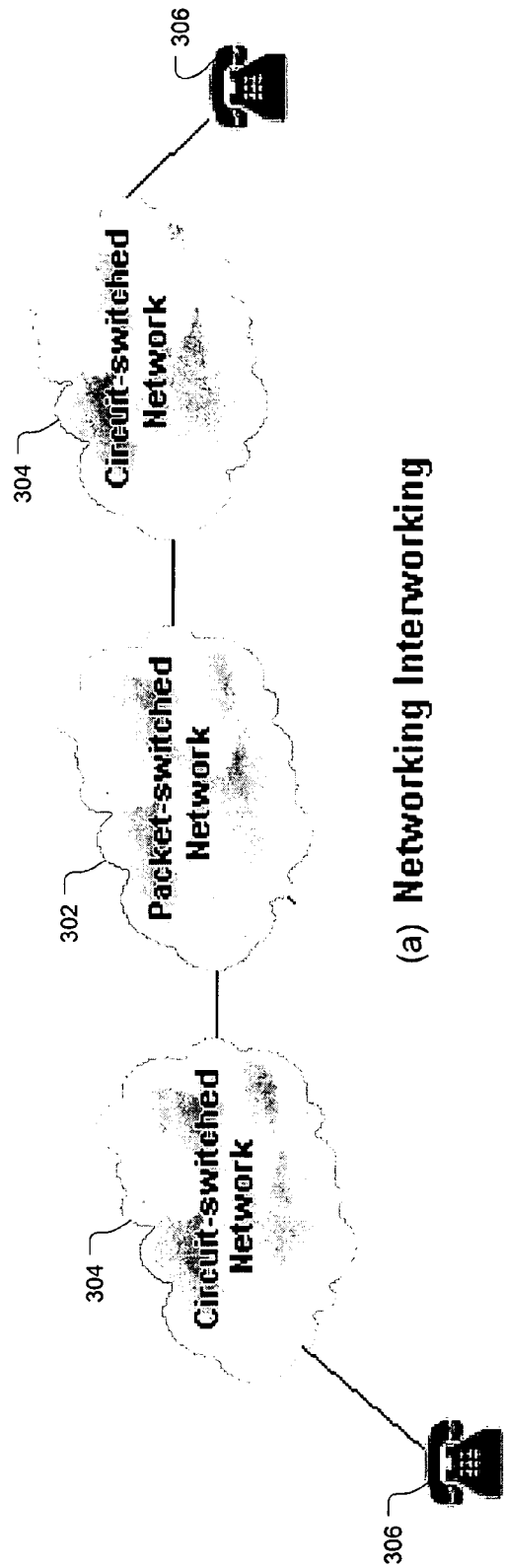
FIG. 3 illustrates various VoIP and interworking scenarios supported by certain embodiments of the present invention.
Figure 3:
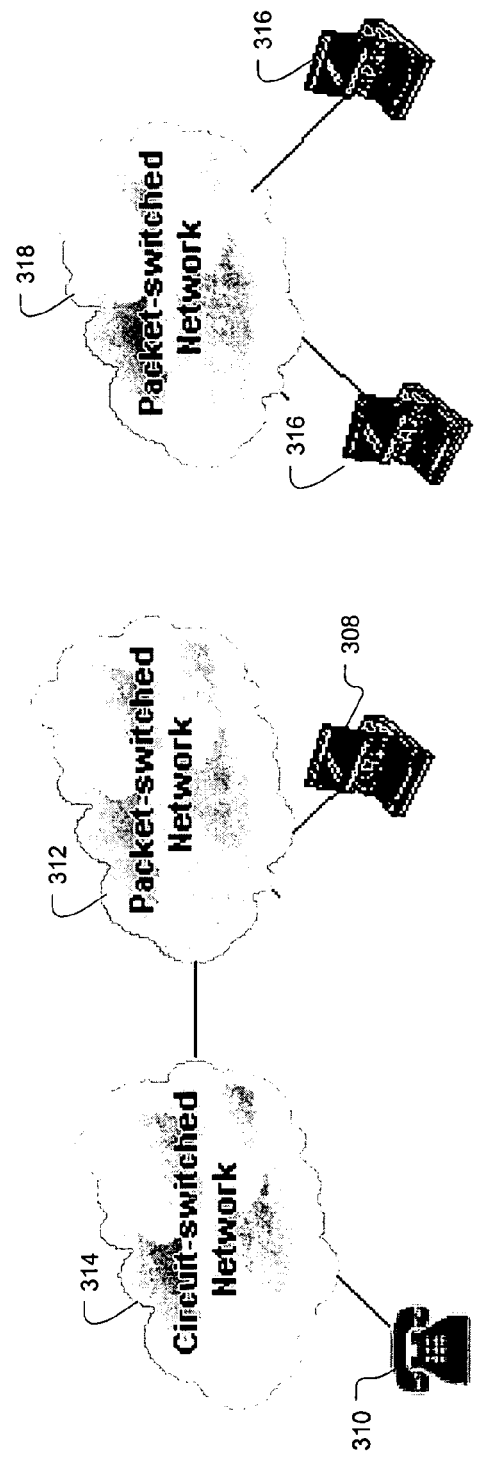

There are at least three distinct scenarios associated with interworking between circuit-switch and packet-switched domains. FIG. 3 illustrates these three scenarios. FIG. 3(a) depicts time-division multiplexing (TDM) to packet-voice network interworking where a packet network 302 is deployed in between two TDM networks 304 (e.g., elements of the PSTN) and the end hosts/devices 306 are traditional voice devices like analog or ISDN phones. FIG. 3(b) depicts TDM to packet/voice-service interworking where an IP endpoint 308 communicates with a traditional voice device 310 over a packet network 312 and a TDM network 314. FIG. 3(c) depicts native VoIP service where IP endpoints 316 communicate with each other over a packet network 318. Embodiments of the present invention are designed to transport across the packet network with a guaranteed QoS in all three scenarios.

The component planes of embodiments of the QoS-managed networks of the present invention include user, control, and management.

User Plane

The following network elements are user-plane components of VoIP networks and services:

VoIP endpoints/hosts: Along with media gateways, the end systems where the VoIP application resides. Each VoIP end point/host is associated with a particular public or private IP address.

Media Switch (MSW): A logical entity that performs multiplexing/demultiplexing of VTGs, and switching of connections from incoming VTGs to outgoing VTGs using locally stored label-mapping rules. Packet networks provide these functions as core services but media-service intelligence helps set the mapping tables. This is similar to having trunk groups set up in the transport layer and having voice switches switch voice connections from incoming trunk groups to outgoing trunk groups.

Media Gateway (MGW): An element used for interworking with TDM networks. It performs media conversion between asynchronous VoIP packets and synchronous TDM byte streams.

Packet Transport Network: The underlying packet network (e.g., IP network) that provides transport for the bearer traffic (e.g., voice packets). The following terminology is adopted for the packet transport network:

Administrative domain: This is the entity that is operated and controlled by a single authority, which could be, for example, a network operator. Typically, services provided by an administrative domain are subject to various formal or informal service-level agreements (SLAs) between the administrative domains authority and its users.

Packet technology domain: Within an administrative domain, it is possible that one or more technologies such as IP, asynchronous transfer mode (ATM), or multiprotocol label-switched path (MPLS) are employed with appropriate interworking functions. The packet technology domain, especially at the network access points, may be differentiated by layer-two technologies such as Ethernet, DSL, cable, and wireless.

Routing Areas: Within each packet technology domain, there can be one or more routing areas depending on the underlying routing technology. For example, two-level open shortest path first (OSPF) routing areas in IP/MPLS networks.

More information on OSPF can be found in RFC2328 "OSPF Version 2," J. Moy, RFC2328, April 1998, incorporated herein by reference in its entirety.

Control Plane

The main functions of the control plane are to setup the bearer connection, maintain the context and state of calls and connections in the network, and apply controls to the user plane. A number of functional entities in the network are used for such purposes, including:

Call Control (CC): Call Control is the entity that establishes and maintains the call context, and, in the case of voice applications, the state of the call.

Connection Resource Manager (CRM): For each call, there can be one or more connections that need to be established to carry the bearer traffic. The logical entity that manages these connections, including maintaining the connection state and routing, is a connection server. The connection server communicates with a resource management module that is responsible for accepting/rejecting the connection setup requests and for allocating/de-allocating resources to connections. The CRM encompasses both connection server and resource manager functionality.

Signaling Server: The signaling server implements the signaling protocols and interfaces to provide signaling-service functions. It supports communications in the control plane of the network.

Signaling Gateway: This device provides interworking of signaling protocols between PSTN and packet networks. For example, signaling system #7 (SS7) is the commonly used signaling protocol in the PSTN, while session initialization protocol (SIP) is a newly emerging IP signaling protocol used to support voice traffic in IP networks. To set up a call across the PSTN and a SIP-enabled IP network, a signaling gateway is needed to translate the messages between these two technologies. More information on SS7 and SIP can be found in CCITT, 1981, Signaling System No. 7 Recommendations, Q.701-Q.707, Q.721-Q.725, Vol. 6.6, Geneva, and M. Handley, H. Schulzrinne, E. Schooler, J. Rosenberg, "SIP: Session Initiation Protocol," RFC2543, respectively, each incorporated herein by reference in its entirety.

Media Gateway Controller: The media gateway controller controls the media gateway during a connection setup phase using protocols such as Internet protocol device control (IPDC) and H.248. More information on IPDC can be found in "IPDC Base Protocol," A. Rubens, P. Calhoun, P. Taylor, 03-Aug-98, Internet Draft draft-taylor-ipdc-00.txt, incorporated herein by reference in its entirety. More information on H.248 can be found in ITU-T Recommendation H.248.1 (03/2002) and "Gateway Control Protocol Version 1," C. Groves, M. Pantaleo, T. Anderson, T. Taylor, Eds., RFC3525, June 2003, respectively, each incorporated herein by reference in its entirety.

SoftSwitch (SS): Softswitch has been used in different ways in the literature. Herein, SoftSwitch is defined as a logical entity that implements a call controller, signaling server, signaling gateway, and media gateway controller. Together with the set of media switches under its control, the SS provides the service of call setup and switching of the bearer traffic similar to conventional switches.

Application Server and Intelligent Network (IN): Intelligent services are provided through application servers and packet IN entities that support service creation and management. Protocols and application interfaces are required between the call controls and the application servers for request/response.

Management Plane

A QoS-managed network of the present invention may include operations and management support including the functions of provisioning, traffic engineering, capacity planning, policy management, fault management, service and subscriber management, performance/QoS/SLA management, monitoring, reporting, auditing, and billing. The time scale of the management plane is usually in minutes or longer and is much slower than that of the control plane. In embodiments of the QoS-managed network of the present invention, time-critical functions are managed in the control plane to meet QoS response-time requirements.

VoIP QoS Considerations

From a user's point of view, QoS in a VoIP network encompasses a number of objective and subjective measures. These measures become apparent as one traces through the sequence of events from the setup until the completion and teardown of a call. Each such measure has an objective. It is important for any VoIP service to recognize the QoS objectives and make sure they are met.

Call and Connection Service QoS

PSTN voice users expect a delay from off-hook to dial tone not to exceed a fraction of a second. They also expect connection establishment, denial, or called-party busy within a few seconds after dialing all digits. Similar delay requirements, depending on the interfaces and human factors can be derived for VoIP applications (see, for example, B. Douskalis, IP Telephony, Prentice-Hall, (2000), incorporated herein by reference in its entirety).

Connection denial or call blocking is desired (and required in PSTN) to be limited. The call-blocking probability is typically expected to be on the order of 0.1% to 1%. Similar to the mobile telephony environment, dial-tone delay may not be applicable to VoIP calls. Thus, the primary measures of the QoS at the call or connection level are blocking probability and the setup delay.

Transport Service QoS

QoS should be maintained for the bearers so that the users will have a satisfactory experience with the service. While the ultimate measure of user experience can be somewhat subjective, e.g., through MOS (mean opinion score) in PSTN, it is also recognized that a few quantitative metrics can be used to infer the subjective QoS and thus to design and engineer the services. The main metrics for bearer QoS in packet networks include:

Loss: This is the loss characteristic of the bearer between the transmitter and the receiver of the media stream. Packet losses may result in delay or degradation of media at the receiver. As a result, it is desirable to have the packet loss be low.

Delay: This is sometimes referred to as "mouth-to-ear" latency for voice applications. The packet infrastructure contributes to the delay of voice samples due to packetization, packet forwarding, and buffering/queuing delays experienced through the links and switches/routers in the packet network. For interactive voice, a one-way delay of less than 150 ms is considered highly desirable.

Delay jitter: This is the measure of delay variation of the application data units. It can be expressed as the distribution of the variable part of the delay. Since TDM networks and constant-bit-rate voice decoders expect to receive samples periodically, delay jitter can cause underrun or overrun of the receiver. A receiver buffer is often used to mitigate such effects, but such buffers can contribute to the delay or packet losses. Hence, there is a need to control the delay jitter.

The quantitative requirements of the bearer QoS depend on a number of factors such as the type of codec and particular applications. Note that, for conferencing and multimedia applications, additional requirements, such as synchronization of packet deliveries over multiple connections, may be needed. Many QoS requirements can be either an absolute bound on a quantity, a probabilistic bound on a quantity, or both. For example, for end-to-end delay (also know as mouth-to-ear or round trip delay), an absolute bound could be that the end-to-end delay should not exceed time T. However, in many applications, it suffices to meet a somewhat less stringent propabilistic bound. A probabilistic bound on end-to-end delay could be that the probaility that the delay exceeds a time T should be less than a small number $\alpha$. In practice, this implies that number of packets that experience a delay that exceeds T, divided by the number of packets transmitted, is less than $\alpha$ when a large number of packets is considered. Similarly, jitter, defined as variation in delay, can be bounded in an absolute sense (jitter less that j) or in a propabilistic sense. The latter would be a requirement that the probability that jitter exceeds j is less than some factor $\beta$. Similarly, a requirement on packet losses could be specified as a bound on the packet loss ratio, where the packet loss ratio is defined as the ratio of the number of packets lost to number of packets transmitted over a large number of packets. More information on QoS requirements of a bearer network can be found in B. T. Doshi, E. Hemandez-Valencia, K. Sriram, Y. T. Wang, and O. Yue, "Protocols, Performance and Controls for Voice over Wide Area Packet Networks," Bell Labs Tech. J., 3:4, (October-December 1998), incorporated herein by reference in its entirety.

Supplemental Services QoS

Supplemental services include features like call forwarding, three-way calling, caller ID, and music on hold. To provide such services, in-band or out-of-band signaling is typically used to communicate service requests to the network. Database queries and other resources may be needed to provide these services.

Factors Affecting Bearer QoS

The factors affecting bearer QoS can be categorized as traffic-profile-related or resource-management-related. As application data units in the bearer plane traverse end-systems, various network elements, and the links connecting them, they experience and accumulate delay, loss, and jitter. Collectively, total load, traffic profile of the applications, resources such as buffers and transmission links, and resource management schemes determine the level of QoS received by each bearer channel.

Proactive and Reactive Controls

There are two major approaches to controlling load and hence to delivering QoS in packet networks: proactive vs. reactive. Reactive controls call for the network to monitor the congestion of resources and, upon detection of (impending) problems, react and take necessary corrective actions. In contrast, proactive control calls for a priori determination of admission or denial of the service when a service request is made. The decision is based on the resources and QoS required by the application as well as on the current resource usage in the network. The intent is to ensure that the accepted calls will get the required QoS. Note that, while proactive control requires more a priori information and the conformance of the application traffic to assumed profiles, reactive control poses a significant risk to the QoS received for all users when the speed of congestion build-up and damage spread is much faster than reaction time designed into the control plane. A preferred embodiment of the present invention uses a hybrid control mechanism that is primarily proactive but uses reactive control for tuning purposes and as a backup system for emergency circumstances or as a safeguard against anomalous circumstances where proactive controls might fail.

Level of QoS

Recent advances in IP technology have been associated with furthering the development of the Internet, where ease of connection and minimal intervention from the network have been major drivers. Although some basic capabilities were available in IP protocols, optimization of QoS features, such as delay, jitter, and loss, has not been a primary driver. As an example, some early proposals for VoIP applications suggest the use of the IP Type of Service (TOS) bit field to support QoS. These proposals suggest setting the IP TOS bit such that voice packets will receive high-priority service at those routers that support priority scheduling via TOS. Such approaches would deliver adequate bearer QoS to voice applications only in networks with the following characteristics:

1) There are no failures in the network,
2) The link transmission time of an interfering (non-voice) data packet is sufficiently small that it does not cause a violation of jitter requirements,
3) The total high-priority traffic load is not too high compared to the link bandwidth, and
4) There is adequate buffer management to maintain sufficiently small losses and limited delays for high-priority traffic.

However, it is difficult for a network operator to ensure that these assumptions would not be violated without additional mechanisms. In particular, many networks may have a large fraction of traffic with demanding QoS requirements so that absence of congestion for high-priority traffic cannot be guaranteed. There was little attention to these issues in the Internet community.

To overcome the lack of QoS guarantees from the network, edge-based QoS approaches have been proposed that use measurement-based reactive methods to predict the QoS and implement call-admission control to admit or reject a connection setup request. See, for example, D. R. Jeske, B. Samadi, K. Sohraby, Y. T. Wang, and Q. Zhang, "An Edge-based Call Admission Control Technique in IP Networks," Proceedings of the 2nd IFIP Networking Conference, Pisa, Italy, (May 2002) (herein "Jeske 2002"), incorporated herein by reference in its entirety.

Such approaches can provide a reasonable improvement on bearer QoS in a simple priority-aware network. In fact, when sending traffic over the public Internet, this may be the only viable option to provide a degree of control. However, these approaches do not meet AQoS objectives of embodiments of the present invention with a target-blocking level. These approaches are also vulnerable to rapid changes in traffic volumes. More information on edge-based QoS mechanisms can be found in Jeske 2002.

PSTN users have come to expect a high level of service quality. In order for a VoIP service to be attractive to such users, the service provider must guarantee a level of service availability and predictability similar to PSTN. AQoS features meet these expectations. Mechanisms employed in certain embodiments of the present invention allow the invention to meet packet delay, jitter, and loss requirements, while bounding the call-blocking probability. These mechanisms are based on a few key observations of PSTN and packet networks. The mechanisms also support migration from and enhancements to circuit-switched PSTN. To better understand these mechanisms, it is useful to better understand the PSTN.

The PSTN

In circuit-switched voice networks, two switches are connected by one or more circuits. These circuits, at T1/E1/DS3/STS1/STM1 rates, are provided by an intervening transmission network that typically includes digital cross connects (DXCs), SONET/SDH rings, or wave division multiplex (WDM) systems. Voice-service providers create trunk groups from these circuits that provide multiple DS0s as logical entities between two switches. Each trunk group is 'provisioned' over a circuit established by the transmission network. Each DS0 can carry one voice call and is called a 'trunk'. During the call setup, adjacent switches in the path of a new call assign a 'trunk' from a trunk group between those switches if a trunk is available. If no trunk is available on one or more segments in the selected path, then the call gets blocked (denied) or alternatively routed over a different path. Consequently, an admitted TDM voice connection is made up of concatenated trunks with TDM switches connecting these trunks. Note that the trunk assignment serves two purposes:

(a) It makes sure resources are available to carry voice samples throughout the conversation, and (b) It allows intermediate switches to cross-connect and switch the voice samples from an incoming trunk (port and time slot) to an outgoing trunk (port and timeslot).

In contrast, in packet-switched networks, each packet carries a label containing information needed to perform purpose (b) above. The information may be source and destination addresses, as in IP packets or Ethernet Frames. In these cases, no signaling is required to allow purpose (b). The information may also be, for example, a virtual connection identifier (VCI)/virtual path identifier (VPI) in ATM, a DLCI in a Frame Relay network, or a label-switched path (LSP) label in an MPLS network. In these cases, provisioning or signaling is used to assign the identifiers to a new connection and set up cross-connects and forwarding tables in switches en route. Purpose (a) may or may not be supported in packet networks. However, standards for IP and MPLS provide tools that can be used for these purposes. These tools are used by the present invention as discussed below.

Creating and Sizing VTGs

Assuming C simultaneous voice calls (with specific coder characteristic, encapsulation protocols, etc.) between two label-based switches with other label-based switches en route, we can compute the equivalent bandwidth, BWEQ (C), needed to keep the delay, jitter, and losses within budget along that path. Label-based switches may be media gateways, edge routers, core routers, MPLS-label edge routers, etc. Some background on this approach can be found in A. Elwalid and D. Mitra, "Effective Bandwidth of General Markovian Traffic Sources and Admission Control of High Speed Networks," IEEE/ACM Trans on Networking, 1:3, (June 1992), 329-343 (herein "Elwalid 1992"), and K. M. Rege, "Equivalent Bandwidth and Related Admission Criteria for ATM Networks—a Performance Study," Int. J. Communications Systems, (1994) 181-194 (herein "Rege 1994"), each incorporated herein by reference in its entirety. Thus, effectively, a guaranteed bandwidth path with capacity BWEQ (C) can be considered equivalent to a trunk group of size C. Such a guaranteed-bandwidth path can serve as a VTG in certain embodiments of the present invention.

If bandwidth equal to BWEQ (Cmax) is reserved for a VTG, and a CAC that limits the number of voice calls on this VTG to below Cmax is used, bearer-level performance requirements can be met in the absence of a failure. With a VTG defined in this way, an accounting method similar to that employed in PSTN networks can be applied. Namely, whenever a new call is admitted to a VTG, a counter is incremented by one. Whenever a call finishes and is torn down, the counter is decremented by one. If a new call request arrives when Cmax calls are already active on that VTG, then the call is denied.

Alternatively, virtual trunks (VTs) can be created in a VTG. That is, VTs in a VTG of size S are numbered from 1 to S, and a call is assigned a number (ID) in that VTG. Unlike in the circuit-switched network, a VT ID does not have a physical significance in the bearer plane. However, this will allow the control plane to work similarly to the way it work in circuit-switched networks and support interworking between circuit and label-switched voice networks, for example, at media gateways and at signaling gateways. This will also help in auditing the status so bandwidth does not get stranded due to poor accounting.

A VoIP service provider may have its own packet network from which it can create VTGs, or it can obtain VTGs from one or more packet network operators. The set of VTGs provided by one packet network operator can be considered a virtual private network with a particular service-level assurance. As VPN technology matures in IP and MPLS, VTG concepts can be implemented more readily in environments with multiple owners for both (i) different layers of networking and (i) multiple domains within a layer.

The decision to accept or reject a call can be made in one or more places depending on the VoIP network topology and control architecture. As defined earlier, CAC decisions in embodiments of the present invention are made in the CRMs.

Single Domain-Network-Interworking Scenario

Figure 4:
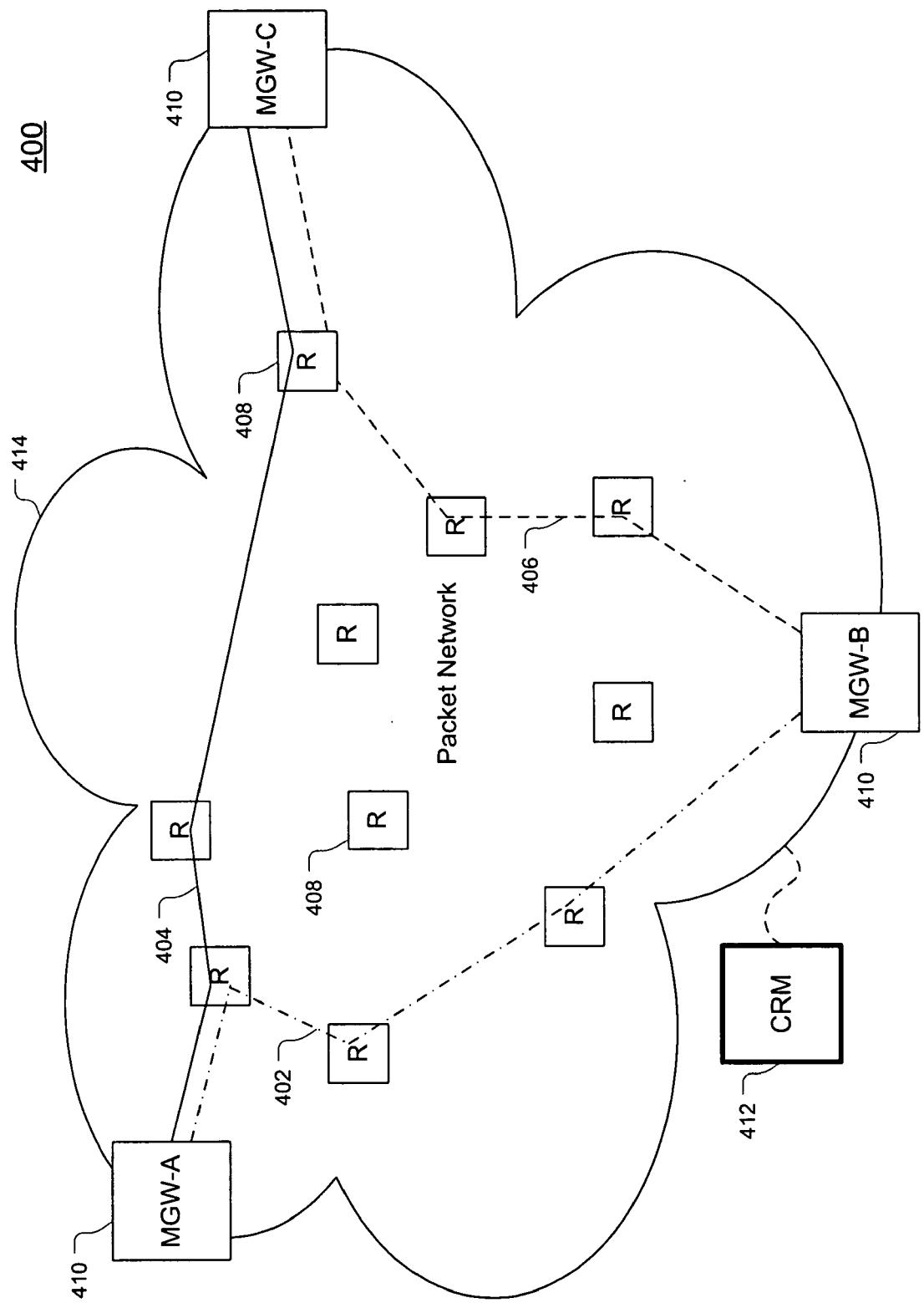
FIG. 4 illustrates a flat-network embodiment of the present invention.

In the following embodiment of the present invention, a VoIP service is used to provide a packet backbone that can be accessed by circuit-switched networks. Media gateways at the borders of the packet network provide the bearer connections and conversions between circuit-switched and packet protocols. This embodiment includes a single administrative domain for all VoIP services, and the network is small enough to be managed as one (voice) routing area. Subsections below discuss variants of this network topology and a number of options that can be used to provide AQOS for VoIP services in this embodiment.

Flat Network: VTGs Between Pairs of Media Gateways In this embodiment, illustrated by FIG. 4, VTGs are created between all pairs of communicating media gateways to carry packet voice streams. Note that significant flexibility exists in the present invention with regard to VTG creation. For example, multiple VTGs can be created between a given pair of nodes in the network. These VTGs can follow the same path or follow different paths. Since in many applications, VTGs are bidirectional, they are typically provisioned as a pair of half-duplex VTGs, one in each direction. However, in some embodiments, the two half-duplex pairs need not be the same size (bandwidth capacity). They also need not follow the same path. A forward VTG can follow one path and a return VTG could follow a different path. Also, two unidirectional VTGs could potentially be provisioned in one direction while only one is the other direction. This latter variant could support, asymmetrical transport of QoS-sensitive demands such as video-casting, for example. Other variants are possible as would be understood to one skilled in the art. FIG. 4 illustrates a flat-network embodiment 400 of the present invention that includes packet network 414 enhanced by connection resource manager 412 and three MGWs 410 (MGW-A, MGW-B, and MGW-C) interconnected by three full-duplex VTGs (VTG 402, VTG 404, and VTG 406). Each VTG is illustrated as a full-duplex connection following a single path through routers 408 in the network. Note that not all routers 408 in the packet network are involved in supporting VTGs in the network. In general, however, each VTG can be thought of as two half-duplex connections, and, in certain embodiments of the present invention, each half-duplex connection of a VTG can follow a different path. If there are N MGWs, this means that N(N-1) half-duplex VTGs will be created. This approach is viable and efficient when the number of MGWs is modest and there is sufficient traffic between a pair of MGWs to justify the creation of a VTG. In this embodiment, MGWs communicate with CRM 412 for CAC. Each MGW receives data from connections on a circuit-switched network, converts the data and connection protocols to a form compatible with the packet network, and forwards the data onward to the appropriate half-duplex VTGs that are incident to it.

Figure 5:
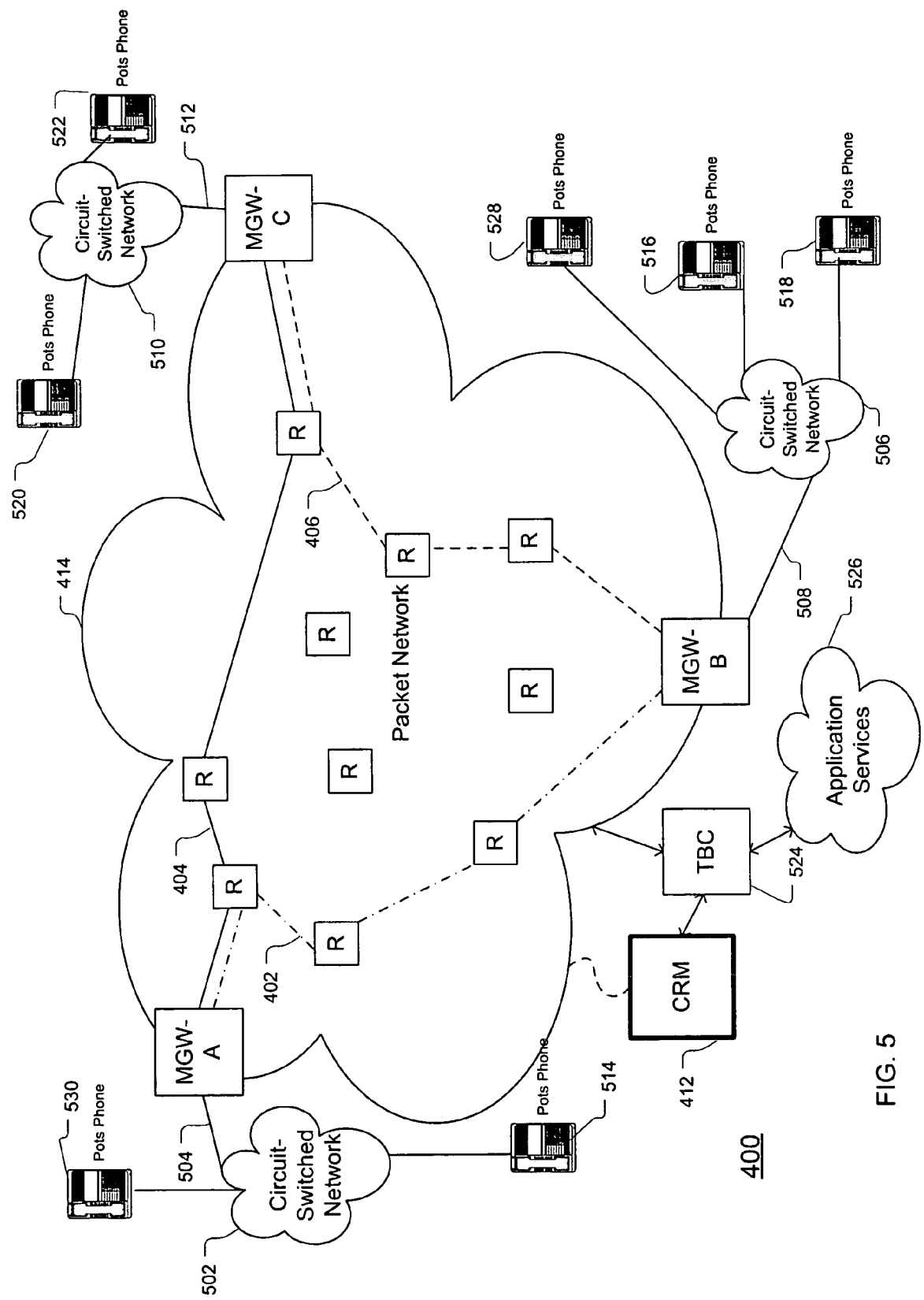
FIG. 5 illustrates an application of the flat-network embodiment of FIG. 4 to a multiple-call interworking problem.

Consider the application of flat-network embodiment 400 of FIG. 4 illustrated in FIG. 5. Here, each MGW is connected to a circuit-switched network via a T1 line. In particular, MGW-A is connected to circuit-switched network 502 via T1 line 504, MGW-B is connected to circuit-switched network 506 via T1 line 508, and MGW-C is connected to circuit-switched network 510 via T1 line 512. Each circuit-switched network is also connected to one or more plain old telephone system (POTS) phones. For example, circuit-switched network 502 is connected to POTS phones 514 and 530, circuit-switched network 506 is connected to POTS phones 516, 518, and 528, and circuit-switched network 510 is connected to POTS phones 520 and 522.

Assume a user associated with phone 516 wants to talk to a user associated with phone 514. The connection between the users can be made from phone 516, through circuit-switched network 506, T1 line 508, MGW-B, VTG 402, MGW-A, T1 line 504, and circuit-switched network 502 to phone 514.

Similarly, assume a user associated with phone 518 wants to talk to a user associated with phone 520. The connection between the users can be made from phone 518, through circuit-switched network 506, T1 line 508, MGW-B, VTG 406, MGW-C, T1 line 512, and circuit-switched network 510 to phone 520.

Note that, in flat-network embodiment 400, MGWs 410 are in a single routing region delineated by packet network cloud boundary 414 and are all associated with a single CRM 412, which is responsible for the VTGs in that region. CRM 412 receives call setup requests from call servers for calls originating from PSTN devices. Knowing which VTGs can be used to route a call, the CRM performs CAC, selects the necessary VTGs, increments the count of active calls (or equivalent bandwidth) on those VTGs, and decrements the count when this connection is torn-down.

Recall that a CRM keeps track of how much bandwidth is currently allocated and available on each VTG under its control. Thus, associated with the two calls discussed above between phones 518 and 514, and phones 516 and 520, CRM 412 will subtract the bandwidth required by each call from the available bandwidth on the VTG that carries the call. If the calls in this example are voice calls in compressed form, then these calls should require 8 kbps each. Thus, CRM 412 will decrease the available bandwidth on each of VTG 402 and VTG 406 by 8 kbps.

Continuing with the example, assume that a user associated with phone 528 wants to talk to a user associated with phone 522. This connection could follow the same path as the connection from phone 516 to phone 520 and share the same T1 lines, MGWs, and VTG as that connection. Namely, the connection between the users will be made from phone 528, through circuit-switched network 506, T1 line 508, MGW-B, VTG 406, MGW-C, T1 line 512, and circuit-switched network 510 to phone 522.

Note that, before this connection is made, the CRM must check the available bandwidth on VTG 406. If there is sufficient available bandwidth to admit the new connection, then the CRM approves the call request. However, if there is insufficient bandwidth available, then the CRM can do one or more of the following. It can (1) dynamically request an increase in the guaranteed bandwidth allocated to the VTG from the network. If the network cannot allocate additional bandwidth for the VTG given the existing path, then the CRM can (2) plan a new path for the existing VTG, where additional bandwidth can be allocated, or (3) request a new VTG (also potentially along a different path) from the network to carry the new call. Failing any of the aforementioned remedies, the CRM can reject the new call.

Similarly, if a call completes, then the CRM will update the available bandwidth value on the affected VTG. If the available bandwidth on a VTG appears to be too large (on a relative and/or short- to long-term statistical basis), then the CRM may adjust down the total bandwidth allocated on that VTG so the bandwidth is not wasted. For example, if the VTG utilization over some designated period (e.g., an hour) remains below some specified threshold (e.g., 80%), then the capacity of the VTG can be decreased to free up the available bandwidth (and associated cost).

Figure 6:
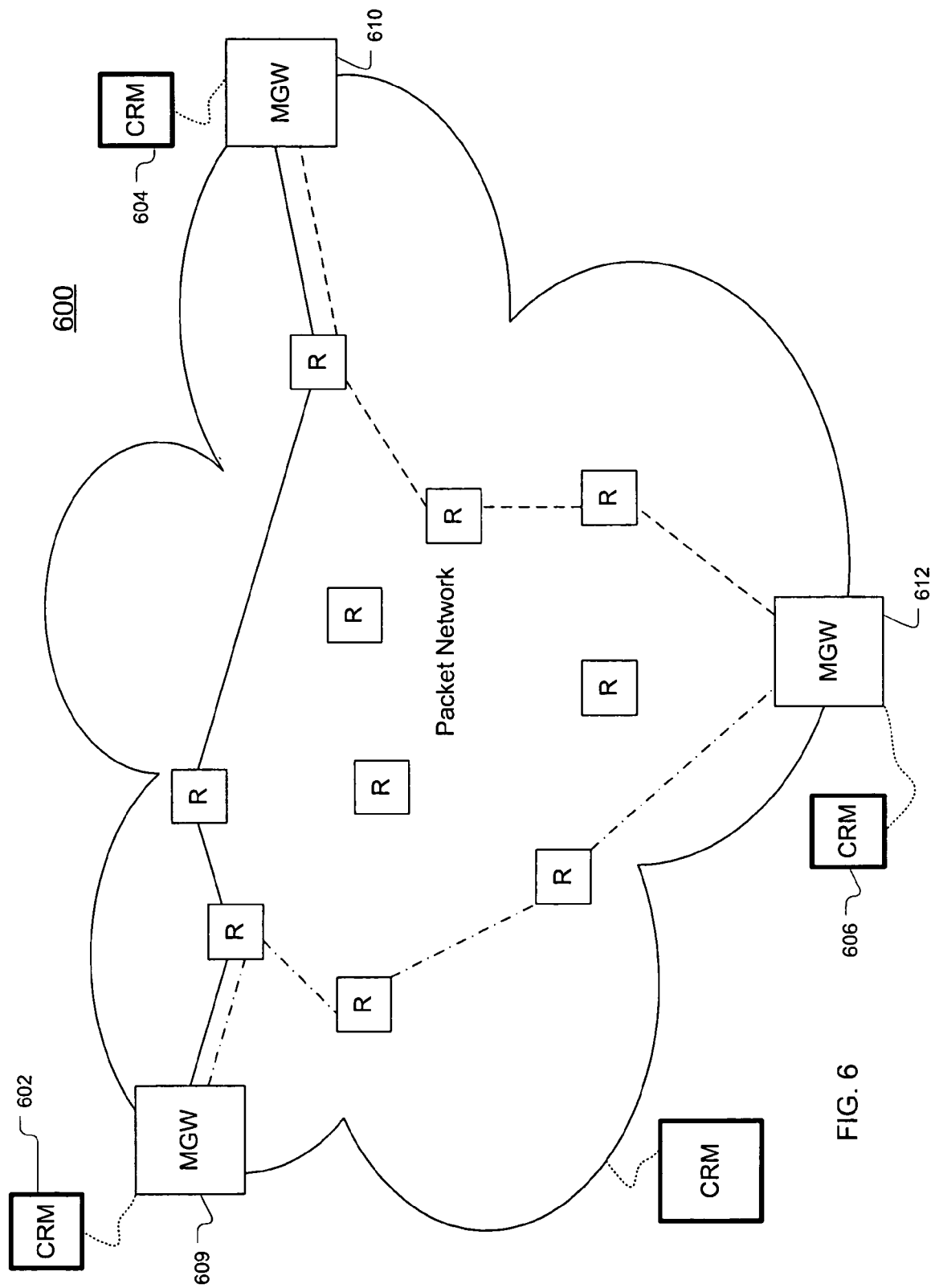
FIG. 6 illustrates an extreme case of a multiple-CRM realization where a connection resource manager (CRM) is associated with each media gateway (MGW).

Note that the CRM may be centralized or distributed. Additionally, multiple distinct CRMs can be implemented for a routing region where, to improve performance, the MGWs are divided into groups, where one CRM is associated with each group. Each of these CRMs will account for all VTGs terminating at the MGWs within its control. FIG. 6 illustrates an extreme case of a multiple-CRM realization (flat network 600) where a different CRM is associated with each different MGW (e.g., CRM 602 is associated with MGW 608, CRM 604 is associated with MGW 610, and CRM 606 is associated with MGW 612). With this arrangement, if there are N MGWs in a routing region, then each CRM only needs to maintain the states of N-1 (half-duplex) VTGs. This decrease in the number of managed VTGs comes at the expense of additional signaling between the CRMs. Hybrid implementations between distributed and multiple-CRM are also possible as would be understood to one skilled in the art.

Path Aggregation: Media Switches (MSW) and Inter-MSW VTGs

In a flat network made up of MGWs and a full mesh of VTGs (N(N-1) half-duplex VTGs for N MGWs), the number of VTGs grows quadratically with the number of MGWs. Furthermore, the traffic on some VTGs may be small (relative to the minimum amount of bandwidth allocation that makes sense given the overhead associated with the establishment of a VTG and the utilization of the VTG inefficient. Thus, another embodiment of the present invention, illustrated by FIG. 7, supports aggregation of calls from multiple MGWs into a common VTG via media switch (MSW) enhancements to edge routers (ERs) within a packet network. As illustrated, multiple MGWs are coupled to each ER/MSW 702 using distinct VTGs. MGW 704 is coupled to ER/MSW-1 via VTG 706. Between ER/MSW-1 and ER/MSW-2 is VTG 708, between ER/MSW-2 and ER/MSW-3 is VTG 710, and between ER/MSW-3 and ER/MSW-1 is VTG 712. Note again that each illustrated full-duplex VTG is actually composed of two half-duplex VTGs, one in each direction.

Call aggregation through an MSW function in an edge router can lead to increased efficiency, fewer VTGs for each CRM to account for, and reduced complexity. Without aggregation, because there are seven different MGWs in this example, the network of FIG. 7 would have required 21 (i.e., N(N-1)/2, where N=7) unique full-duplex VTGs. Instead, through aggregation, it can function with just three full-duplex VTGs.

Additionally, because each VTG between MSW-enhanced edge routers now carries traffic from multiple pairs of MGWs, higher utilization of those VTGs can be realized. This is because statistical multiplexing can be effectively utilized within each MSW-enhanced edge router. In general, because the busy periods between different pairs of MGWs do not coincide, by using statistical multiplexing, the size of each aggregated VTG between enhanced edge routers can be reduced.

The MSW enhancements to the edge routers also allow them to perform per-call functions based on information communicated at the connection setup time for the call. The specific functions depend on the underlying packet technology. Routers typically provide most of the facilities to support these functions but the interfaces to CRMs to activate these capabilities are part of the voice services layer. However, in certain embodiments of the present invention but reside inside the edge routers as part of the MSW function. Thus, the VTGs between MGW pairs pass through edge routers assisted by the function of the MSW, which in turn provides an interface to the CRM that supports accounting and resource management of the VTGs. These VTGs is managed by one or more CRMs (depending on whether a flat, distributed, or multiple-CRM implementation is used).

In some situations, business models may suggest that the MSWs be separated physically from the edge routers. In these situations, an MSW would be placed between the MGWs and the edge router. In other embodiments, MSW functionality can be integrated into MGWs.

Figure 7:
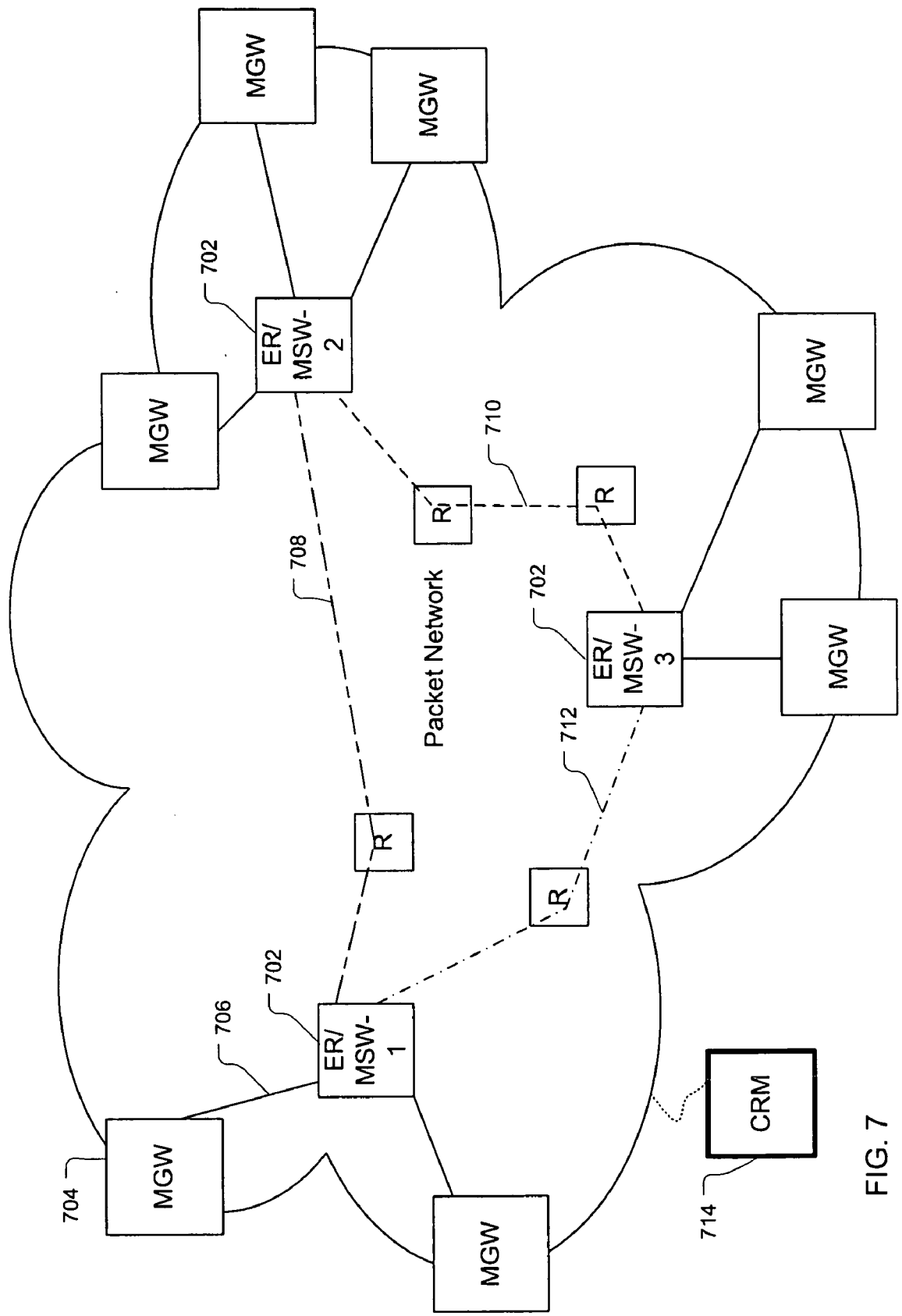
FIG. 7 illustrates support for aggregation of calls from multiple MGWs into a common virtual trunk group (VTG) via media switch (MSW) enhancements to edge routers within a packet network according to certain embodiments of the present invention.

For small networks, all the MGWs and MSWs can be organized into one area. A single CRM can be implemented for the whole area. This CRM manages all VTGs in the area between MSW pairs. This includes those VTGs between MGWs and their MSWs as well as those VTGs between MSWs. This embodiment is illustrated by FIG. 7, where CRM 714 is responsible for accounting, resource management, and CAC for all the VTGs in FIG. 7.

Figure 8:
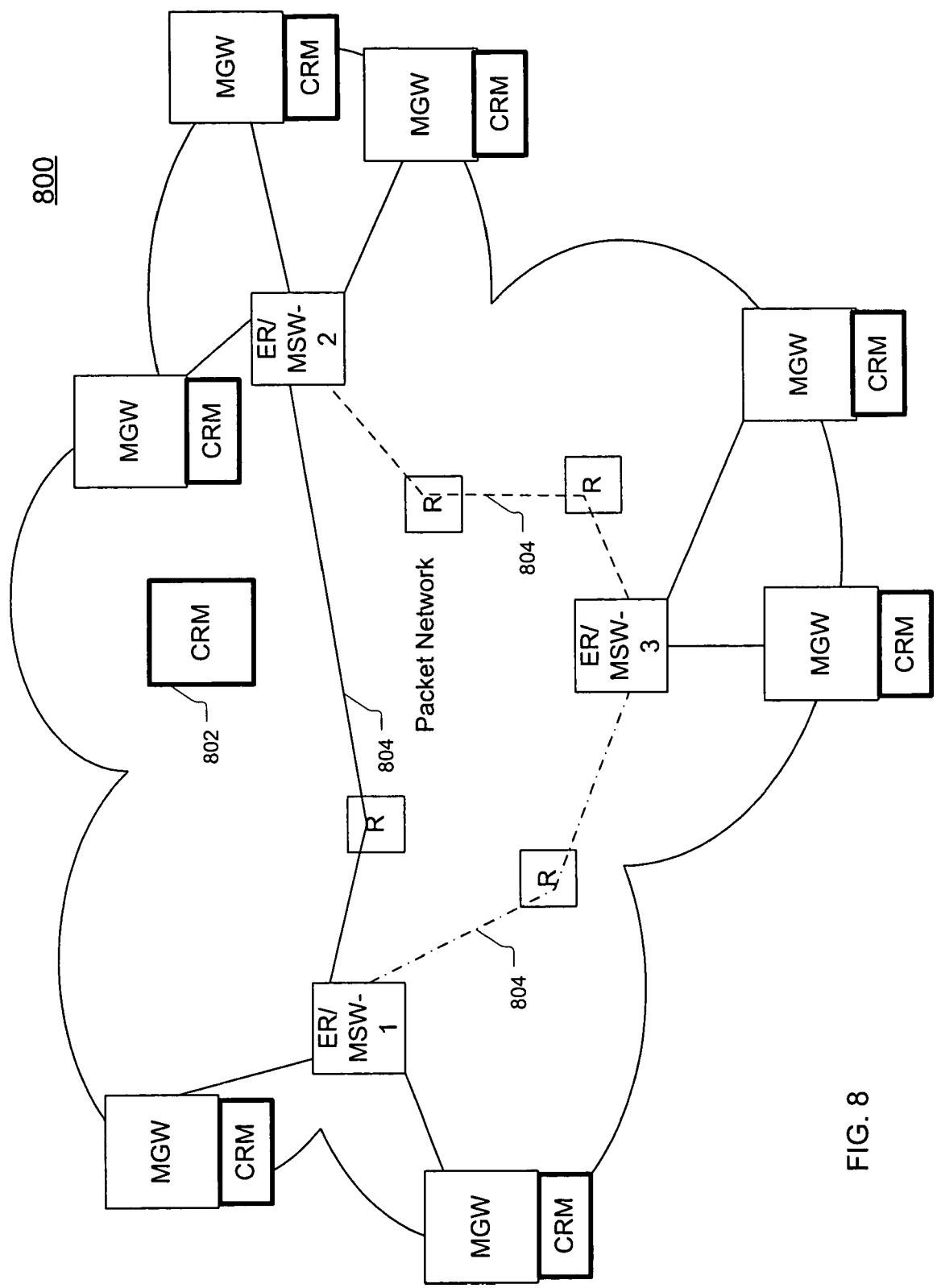
FIG. 8 illustrates a distributed-CRM variant of the present invention.

If it is anticipated that the VTGs between the MGWs and the MSWs have a high probability of congestion, and the number of MGWs is large, it is possible to have a more scalable solution by giving each MGW a CRM that accounts for the VTG between that MGW and its corresponding MSW. Inter-MSW VTGs are then managed by yet another CRM. This case is illustrated by network 800 of FIG. 8, where the VTG from each MGW is managed by the CRM that is illustrated as coincident to the MGW, and CRM 802 manages the three inter-MSW VTGs 804.

Hierarchy of Areas: Architecture and CRM Implementation

The embodiments of the present invention discussed up to this point involve VTGs directly between all pairs of MGWs/MSWs. These embodiments fail to scale when the number of pairs of MGWs/MSWs becomes very large and each pair carries little traffic. In particular, efficiency drops dramatically as the VTG occupancy or traffic intensity falls. Also, when few MGWs share an MSW, the statistical multiplex advantage of the MSW decreases because the time-of-the-day variation in traffic distribution (non-coincidence of busy periods on different VTGs) is not as randomized. Finally, operations become more complex as the number of VTGs becomes too large.

The solution is to create one or more levels of routing hierarchy. MSWs can be considered as edge devices of a higher-level network in the hierarchy and used to aggregate traffic between media gateways. When the number of MSWs becomes large, yet another level of hierarchy can be created.

If VoIP deployment starts from the core (say, replacement of existing class 4 switches), then another level of hierarchy is not anticipated to be needed in the near future. However, when VoIP moves to the edge of the network and has the potential of using several thousand small gateways, the number of MSWs may become too large for full mesh connectivity. It is in such a case that another level of hierarchy can be very desirable.

Figure 9:
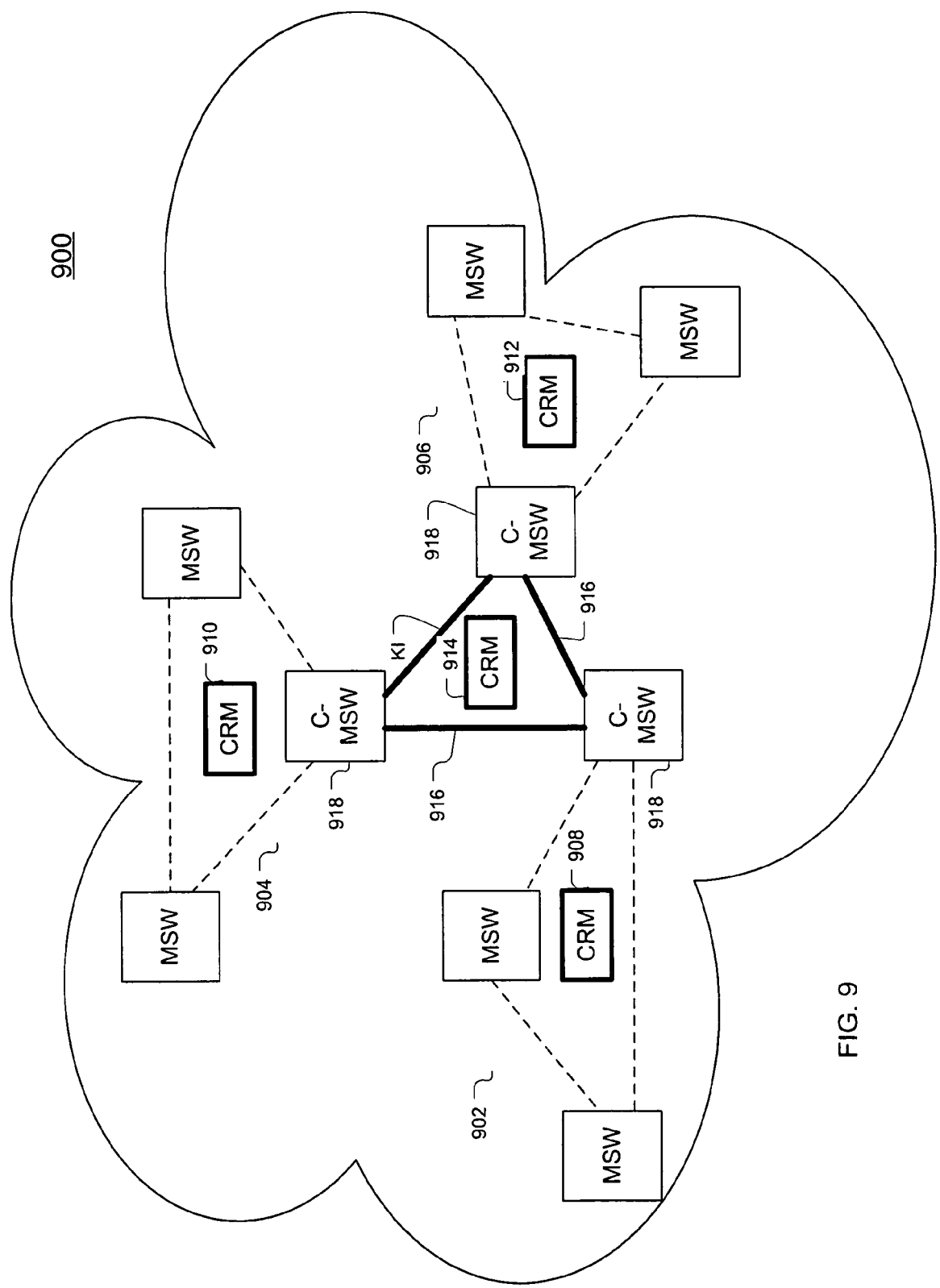
FIG. 9 illustrates a hierarchical embodiment of the present invention.

FIG. 9 illustrates a hierarchical embodiment 900 of the present invention. As illustrated, the MSWs are divided into three clusters 902, 904, and 906, where each cluster is managed by its own CRM (908, 910, and 912, respectively) at the first level of the hierarchy. Within each cluster, one of the MSWs is designated to be a core MSW (C-MSW) 918. The three C-MSWs 918 (one from each cluster) are themselves interconnected by a set of VTGs 916. The C-MSWs and the VTGs that interconnect them are considered to form the second level of the hierarchy. A level-two CRM (914) is used to manage the level-two VTGs 916. A C-MSW plays a role similar to that of an MSW in the sense that a C-MSW can be hosted by edge routers and use packet-network service-level assurances (SLAs) to create VTGs between them. However, C-MSWs are connected by VTGs in level-two areas. Each C-MSW provides a connectivity point from any MSW in its local level-one area to all other level-one areas. Thus, every MSW in an area has a VTG to a C-MSW in its local area. Any connection between two MSWs in two different level-one areas goes over three VTGs: (1) A VTG between a source MSW and its local C-MSW, (2) a VTG between two C-MSWs at level two of the hierarchy; and (3) a VTG between the second C-MSW and the destination MSW.

Hierarchical embodiments of the present invention can have one CRM for the entire network (all level-one areas and the level-two area) or local CRMs, one for each different area at each different level (as illustrated by FIG. 9). In the central CRM approach, all new connection setup requests and connection teardown requests go through the one CRM. Also, this CRM knows about all VTGs and their capacities. Thus, this CRM can keep track of the states of all VTGs in the network and decide if a given connection request should be accepted or denied. Note that there may be more than one physical CRM for reliability reasons, but logically they form a single high-reliability functional unit.

Alternatively, there can be one CRM for each level-one area and one CRM for each level-two area as shown in FIG. 9. The CRM in a level-one area keeps the status of VTGs between MSWs and the C-MSW in that area. The CRM in the level-two area keeps the status of VTGs between the C-MSWs. A connection request between MSWs in different areas can involve three CRMs and associated CAC functions. Note that the architectural flexibly of the present invention supports the separation of the control plane from the bearer plane.

Note that in flat network or hierarchical embodiments of the present invention, it is possible for the logical circuit-switched network that is created by the invention to span multiple administrative or technology domains. In such cases, a connection may involve several concatenated VTGs with MSWs in between. Each VTG can remain in one domain, or it can span multiple domains. In other words, a VTG may be made up of a plurality of VTG segments from different domains, that are concatenated together logically in series (typically joined by a router but not by an MSW) to form one logical VTG. The division of a VTG into segments usually corresponds to the division of CRM management between domains.

Services/Applications Interface

Most intelligent services in PSTNs use profiles and logic in databases and servers before connections are set up. They do not interface with bearers directly. Since signaling and control logic in embodiments of the present invention are virtually identical to those in the PSTN, the interfaces from the call/connection servers to intelligent network (IN) entities and similar future services can be migrated from the equivalent functions in PSTN. The lower-layer protocols for communications between call/connection servers and IN entities can be changed to support new and more attractive alternatives.

Traffic Engineering of VTG

Embodiments of the present invention are designed to provide bearer-level QoS guarantees and bounding of the blocking probability. For these features, it relies on the following:

The equivalent bandwidth BWEQ (C) for C calls is accurate enough so that a VTG can support C calls without violating any of the bearer QoS parameters (e.g., loss, delay, and jitter).

The VTG sizing is accurate enough to keep blocking probability below a specified value.

Note that the voice-service providers typically obtain performance measurements and use them to fine-tune the above. Furthermore, packet networks can support dynamic changes in the VTG bandwidth allocation, making it possible for the voice-service providers to implement traffic engineering methods using measurement-based control of VTG size and of the number of trunks for a given bandwidth. Of course, the same measurements can be used to adapt VTG sizes as the traffic grows/shrinks.

If voice calls use constant-bit-rate coding without silence suppression (the most likely scenario for high-quality PSTN backbone applications), BWEQ (C) can be estimated by adding protocol overhead to the TDM bit rate. This approach minimizes the need to fine-tune the VTG sizes dynamically.

For voice applications that use voice coders with silence suppression and variable-bit-rate coding, there is a natural statistical variation in bandwidth used by C active calls. As in ATM networks, BWEQ (C) is then the equivalent bandwidth required to carry C simultaneous calls and meet some specific QoS requirements. A large body of research (see, for example, Elwalid 1992 and Rege 1994) focused on estimating BWEQ (C). However, measurements of utilization with C active calls as well as the measurements of loss, delay, and jitter may highlight possible variations from the assumptions used in calculating the equivalent BW function. If such a variation is systematic, then CAC can be tuned to reduce or increase the number C for a given VTG size. On the other hand, these variations may be short-term, lasting only a few minutes. Similar to most dynamic controls, care should be taken in reacting to such short-term variations. Otherwise, oscillations may either violate the QoS guarantees or oversize VTGs or both.

Multiple Administrative Domains

So far, VoIP networks with one administrative domain and one or more VoIP routing areas have been addressed. Similar to PSTNs, there can be more than one VoIP service operator involved in completing a call/connection over multiple VoIP administrative domains. Additionally, each domain may have a flat or hierarchical structure.

Fundamentally, the structure is similar to the structure used for multiple routing areas, namely hierarchical, in particular, when there is a one-to-one correspondence between routing areas and administrative domains. An example of this is the hierarchy of remote voice switches, class 5 switches, tandem, and toll (class 4) switches in present-day networks. Each local routing area can be considered one level-one area, and all class 4 switches can be considered one level-two area.

Alternatively, certain embodiments of the present invention support multiple administrative domains without using hierarchy.

Effectively, the network of media switches (MSWs, C-MSWs) are organized in multiple clusters such that each cluster is managed by one administrative entity. Each one negotiates with its packet-transport network to provide the VTGs required within its domain. By mutual agreement, each administrative domain selects which of the MSWs within the domain will be used to interconnect different domains. While interconnection can be done in many different ways, here the inter-domain MSWs are logical entities designated as border media switches (B-MSWs). Note that a B-MSW could be the same as a C-MSW or a routing hierarchy or it could be different.

Border CRM of an Administrative Domain

In certain embodiments, separate administrative domains will have separate CRMs. A border CRM (B-CRM) is the CRM that manages the B-MSWs and the VTGs between peer B-MSWs in other domains. All VTGs within a domain are managed by one or more CRMs within that domain. These CRMs thus implement the necessary accounting function and CAC for VTGs in that domain. B-CRMs also manage the interconnection of B-MSWs and treat the interconnections of B-MSWs as VTGs.

B-MSWs and B-CRMs are logical entities. They are typically functions added to regular MSWs and CRMs, respectively. One functional difference is due to the absence of a strict hierarchy, which would allow simpler routing of calls among CRMs for controls and among MSWs for bearer traffic. Given the possibility of peering, additional inter-domain routing intelligence is provided.

Connection-Level SLAs Between Domains

An important consideration for QoS guarantees in networking across multiple domains is the end-to-end service-level assurances (SLAs). Each voice-service provider (administrative domain) can use the tools available from packet networks to guarantee any specified SLA on a voice bearer and to bound blocking probability. In a multi-domain environment, it is also important to:

Guarantee bearer QoS for end-to-end connections traversing multiple domains, and Make sure that the VTGs in each domain are engineered to bound blocking probability.

The first factor is important because the weakest performing domain will dominate end-to-end quality of voice. The second factor is important because rejecting a connection request after a domain has accepted it results in waste of call-processing capacity and possible crankbacks. It also wastes some bearer capacity due to the fact that resources may be reserved for some duration before denial from one domain frees them. Finally, high blocking probability in one domain may cause retries affecting all domains and risking a serious control plane overload.

To solve this, (1) bi- and multi-lateral agreements covering the requirements from each domain and (2) measurement mechanisms to make sure that these requirements are met are put into place. Once again, the bearer and control-plane capabilities in the latest protocols for packet networks as well as control-plane measurement and engineering lessons from PSTNs provide tools to define and monitor SLAs across domains.

Architectures for Single Domain-Service-Interworking and Native VoIP Scenarios

The above embodiments of the present invention focus primarily on the network interworking scenarios where VoIP flows originate and terminate at MGWs. For the service-interworking and native VoIP scenarios, at least one of the endpoints of the VoIP flow is an IP host. Conceptually, the notion of MSW and VTG carries over to these scenarios directly. VoIP service providers can implement an access MSW (A-MSW) through which subscriber's VoIP flows are admitted into the service network by the responsible CRM. In such cases, an A-MSW can be attached to, for example, a digital subscriber line (DSL) access multiplexor (DSLAM) or a cable modem termination system (CMTS), or an A-MSW can aggregate traffic from many such devices. It can also aggregate traffic from many IP-PBXs. VTGs can then be implemented as before. In the case of non-hierarchical implementations, A-MSWs are connected to MSWs by VTGs. In the case of hierarchical implementations, A-MSWs are connected to C-MSWS by VTGs. Finally, in the case of multiple-domain implementations, A-MSWs are connected to B-MSWs by VTGs. The hierarchical embodiments are most useful when the VoIP network is expanded out from the backbone to such access aggregation points as the A-MSW. Recall that MGWs can contain A-MSWs as logical entities in some embodiments. In some embodiments, the VoIP network is expanded out even further into access networks via access technologies (e.g., hybrid-fiber coax (HFC) and wireless). Most access technologies offer tools to create VTGs in some form as discussed in the following sections.

Virtual Trunking Technologies: VTGs in Packet Networks

Within a packet network, a VTG may pass through multiple routers. Control and management systems in the packet network need mechanisms to provide VTGs with desired service-level assurances. The features of a VTG are (i) guaranteed bandwidth along the entire path and other service-level assurances (e.g., delay, jitter, and losses) if the traffic is within specified bounds and (ii) in-sequence delivery of packets.

Traditional IP networks have limited mechanisms to provide these level-of-service guarantees. Prior approaches used separate ports and links, along with gross over-provisioning of bandwidth to attempt to meet these guarantees.

Recent developments in IP (e.g., DiffServ, IntServ, RSVP), however, can be used to support VTG features while also allowing resource-sharing with less-demanding applications. The most recent development in MPLS along with traffic-engineering extensions in MPLS, OSPF, and RSVP provide even better tools to support VTGs along with applications that require only best-effort bandwidth as discussed below. Any or a subset of these techniques can be used in various embodiments of the present invention to support VTGs.

VTG Support in Legacy IP Networks

In legacy IP networks, destination-based forwarding is primarily employed, OSPF or one of the other Interior Gateway Protocols like IS-IS is used within domains, and BGP is used as the Exterior Gateway Protocol between domains. While the "type of service" (TOS) field is available to indicate priority, it has rarely been used in the legacy IP network. Without the use of TOS to indicate priority, the preferred way to implement VTGs in legacy IP networks is to dedicate ports and links for voice services and size those links and ports to match VTG bandwidth requirements. If routers can act on the TOS field to imply simple priority for voice over all other traffic (which is treated as best-effort traffic), then the principle is the same except that the capacity remaining on the links and ports (after satisfying the need for voice VTGs) can be used for best-effort traffic.

Since IP routing is connectionless in theory, it raises a question as to how to decide which links and ports to size for which sets of VTGs. In the real world, however, legacy IP networks use OSPF or IS-IS or any other IGP link-state advertisements only to notify up-down status rather than detailed congestion information. Thus, all packets from a given flow are routed over the same path in absence of a failure. Moreover, such a path can be calculated a priori based on weight settings and topology information. This is one way to identify the routes of calls between two MSWs and identify loading on each link and port. In turn, this will allow sizing of links and ports to meet the needs of VTGs. Note that this is equivalent to off-line design of the network based on traffic estimates and the subsequent implicit creation of VTGs by providing capacities on imputed paths.

In the event of a failure, OSPF and other link-state-advertisement mechanisms allow detection of the failure and alternative routing of packets. One approach to handling failures is to calculate alternative routes for different failures and size the links and ports to have capacity to handle alternative-routed traffic as well as primary-routed traffic, while allowing a high degree of resource-sharing for different failures. Methods are available to design networks of this type. Another approach is to have a mechanism that allows failure information to be communicated to the CRM to reduce the bandwidth available for affected VTGs and change CAC parameters.

The above method assumes that destination-based routing is used in the IP networks and that the routes are calculated based on the shortest path available (given no failures). If, at a given time, more capacity is available in some parts of the network and other parts are heavily loaded, OSPF and most other IGPs in use today will not allow 'routing' based on where extra capacity is available.

There are also a number of methods available to establish a path in a more-controlled fashion. They do, however, suffer from some additional overhead and hence reduced efficiency. Some possibilities are:

Tunneling, where IP-in-IP tunnels can be set up in between the MSWs or between an MSW and a core router and then between that core router and a destination MSW.

Static routing, where paths can be specified by bypassing the normal IP forwarding table.

Source-based routing, where paths can be specified in the header of each packet by a sequence of IP addresses (hops).

Source-based routing incurs significant packet overhead when considering the small payload of VoIP packets. Static routing involves special manual operations and management to bypass the normal forwarding table in the routers. Further, some routers process such traffic on their "slow path," and these packets thus incur more processing overhead and delay in the user plane. IP tunneling adds to the protocol overhead on the packets as well. However, it does provide the capability to create routing segments and direct the traffic along the desired path. This is useful in supporting the hierarchical embodiments of the invention discussed earlier.

VTG Support in IP Networks Supporting IntServ and DiffServ

Two notable efforts in developing QoS support in IP networks during the last decade have been IntServ and DiffServ. The IntServ model includes RSVP, a soft state-based, receiver-initiated resource reservation signaling protocol that supports QoS services through "guaranteed service" and "control load" mechanisms. IntServ, with RSVP on the whole VTG, can be used to guarantee bandwidth along a VTG path and make the VTG bandwidth allocation more formal than the implicit mechanism used in legacy IP networks. It still relies on OSPF-type protocols to find the paths and cannot use idle capacities on alternate routes. Note that the RSVP used here is for VTG bandwidth reservation, and not for per-call bandwidth reservation as is typical in IntServe model. The latter approach suffers from serious scalability issues. The former allows dynamic allocation of bandwidth to a VTG as is desired in the present invention.

More recently, a DiffServ model has been proposed in which edge routers would classify and mark the DiffServ (DS) field of each packet with the desired DiffServ Code Point (DSCP) that specifies the per-hop forwarding behavior of the core routers. One of the main motivations for DiffServ was to address the scalability problem of core routers in supporting IntServ by removing the requirement of the soft state and by working at an aggregate level. Since, in the present invention, IntServ is used in certain embodiments only for large aggregates (VTGs), the scalability issue goes away. The key benefit of DiffServ in this context is that it can provide a mechanism to inform interior routers of the priority assigned to a packet. Thus, traffic with low priority is allowed to enter the network with the DS field marked so that these packets do not interfere with voice packets for which bandwidth is reserved. In other words, DiffServ and RSVP together allow the implementation of VTG bandwidth guarantees.

In summary, IP network supporting IntServ or DiffServ can implement VTGs with more control than the legacy IP networks do. However, destination-based hop-by-hop route selection following traditional IP protocols is rather restrictive and does not allow the most efficient routing and use of the network resources.

MPLS and Traffic Engineering Extensions

MPLS technology has been developed over the last five years, adopting layer-three IP routing protocols and layer-two ATM connection-oriented forwarding and switching techniques. Some important capabilities provided by MPLS and its traffic-engineering extensions are:

Ability to set up a 'virtual connection' in the form of a label-switched path with a forwarding mechanism similar to those in Frame Relay and ATM. This provides an explicit guarantee that all packets in an LSP will follow the path selected at the time of LSP setup (or alternative-route selection after an LSP failure, if specified). In particular, LSPs provide natural realizations of VTGs in MPLS networks.

Ability to specify the route of an LSP through the MPLS network explicitly. Thus, LSPs (VTGs) can be routed based on the capacities available in various parts of the network, rather than based on a capacity-blind OSPF and other IGP protocols. Explicit routing such as Constraint Based Routing allows better use of available network capacity.

Traffic-engineering extensions to OSPF (OSPF-TE) and other link-state advertisement to communicate topology as well as capacity information to all nodes.

Signaling extensions like CR-LDP (Constraint-based Routing-Label Distribution Protocol) and RSVP-TE allow the use of capacity information to request explicit routed paths with bandwidth guarantees. Thus, distributed mechanisms are available to set up explicitly routed LSPs based on network-wide capacity information. Alternatively, management-based provisioning can be used to set up explicitly routed LSPs based on centralized capacity information.

Dynamic, distributed, LSP establishment and bandwidth reservation capability mentioned above also allows dynamic changes in bandwidth reserved for a LSP.

Ability to provide QoS differentiations via the EXP (Experimental) field and label assignments to an FEC (Forwarding Equivalence Classes) for delay and loss QoS, respectively.

Ability to provide protection and fast restoration of LSP services. Many flavors of protection and restoration services are possible that can support fast recovery upon failure ranging from instantaneous recovery from 10s of milliseconds to several seconds. See, for example, M. A. Qureshi, H. A. Liu, T. Liu, R. Nagarajan, J. L. Oliva, B. Ramanna, A. Sathyanath, and Y. T. Wang, "Resilient Packet Mesh (RPM): A MPLS-Based Reliable Packet Transport Technology," Lucent Bell Laboratories Internal Memorandum, (Apr. 9, 2002), and R. Nagaraj an, M. A. Qureshi, B. Ramanna, C. Hunt, R. Chandwani, B. Das, and A. Shritriya, "A Fault-Tolerant MPLS-Based Control and Communication Network for the Lucent LambdaRouter," Bell Labs Technical Journal, 6:2, (2002), 153-169, each incorporated herein by reference in its entirety.

Ability to nest LSPs so that many smaller LSPs can be bundled into a larger LSP in the segment where they share the route. This is also useful in creating hierarchies.

It is clear from the above that the LSP concept, along with the other capabilities and extensions in RSVP, OSPF, and IS-IS provide a natural vehicle for implementing VTGs in MPLS-based networks. While the required bandwidth on a VTG can be estimated by a mix of planning and measurement-based techniques, some communication is needed between the voice-service provider and packet-network operator to make sure that the dynamic requests are satisfied.

The endpoints of LSPs (VTGs) are the natural places for the voice service and packet transport to provide the interface. MSWs provide the logical entities where this interaction occurs. CRMs provide the needed information to the MSWs at connection setup time. MSWs then use this information to help route the voice packets along the right LSPs.

Transport Bandwidth Control (TBC) Function

Embodiments of the present invention involve a layered architecture where voice services are packet networking technology agnostic. To achieve this, the CRM maintains the state of the VTGs in its area, manages and accounts for their resources, and performs CAC, while the packet network provides the VTGs with the underlying transport service.

To maintain a separation of the voice-service layer and the packet-transport layer, in certain embodiments, a transport bandwidth control (TBC) function is utilized. As illustrated in FIG. 5, a TBC (524) can interface with a voice-service provider (526) to get input on the number of VTGs required, their associated bandwidths, and bandwidth changes that might be required to support anticipated voice services. The TBC then communicates to the packet-transport network (414) to request the needed VTGs (or changes in VTGs).

The TBC can be implemented in policy servers and act through policy specifications that then activate controls (e.g., RSVP-TE, CR-LDP), or the TBC can be implemented in a management system. Alternatively, the interface between voice service and packet transport can be purely in the signaling and control plane and further exploit the ability of packet networks to dynamically allocate required resources. Policy server/management system embodiments are similar to signaling server implementations with one difference being that the signaling server response times are typically faster.

Note that, from the perspective of the voice-service network, a CRM is the entity that knows the maximum capacity available to VTGs in its area. This data is provided to a CRM (e.g., CRM 412) at the time of establishment of a VTG and is subsequently updated through a network management interface or signaling/control interface. CRMs also collect measurements that may suggest changes in VTG bandwidth. The TBC receives such information from the CRMs and uses this information to implement changes in the VTGs.

CRM Accounting

Bandwidth-reservation schemes employed by a CRM maintain an accurate accounting of the free bandwidth in VTGs under its management so that decisions can be made about acceptance/denial of new requests. This accounting involves subtracting from the available bandwidth pool the bandwidth allocated to a new request. It also involves adding bandwidth back to the pool when a connection is torn down. More generally, the accounting involves updating the free-bandwidth status whenever changes occur due to new allocations, removal of existing allocation, and modifications in existing allocations.

When accounting is not accurate, there are situations where the commitment of resources exceeds the capacity of a VTG (e.g., when the accounting fails to subtract some allocation) or when some capacity is lost (e.g., when the accounting fails to add freed-up capacity back into the pool). This problem can be encountered when slow and less-frequent provisioning is used (e.g., management-plane provisioning) and in fast connection setup using signaling (e.g., in the control plane). Auditing techniques can minimize the frequency and duration of errors. To this end, embodiments of the present invention maintain tables of virtual trunks associated with Call IDs, start time, etc., that are available to auditing functions. Thus, for example, if a call ID for an active call indicates a start time that was way in the past, it can be flagged and the call checked for unrecorded termination.

Reliability

To achieve AQoS, elements such as Softswitch, MGW, MSW, CRM, edge and core routers, and VTGs are all assumed to be available. Clearly failure of any of these resources could disrupt the support of the AQoS for some connections and users. Thus, embodiments of the present invention assume use of strategies for detection and recovery from various failure at the voice-service as well as packet-transport layer. Some recent advances in resilient MPLS services are particularly useful in this regard. In particular, diverse MPLS LSP tunnels can be created in relevant embodiments to support levels of resiliency and recovery speed that match application reliability requirements.

Further, there is a need for the packet-transport network to feed back failures of VTGs to the CRM. This can be done through an interface to the packet-network management system, which should be aware of the packet-transport network failures.

CONCLUSION

Embodiments of the present invention involve an architecture and QoS strategy that support end-to-end QoS in a packet network comparable to that provided in PSTNs. The architecture delineates the functions of the voice-service layer and the underlying packet-transport network. It defines a connection resource manager in the service layer that performs the CAC function for virtual trunk groups within its purview. The CRM can be implemented and provided by the packet network using various mechanisms depending on the particular technology and architecture. The architecture supports VoIP services over various interworking scenarios between the PSTN and packet networks. It is scalable and supports different business models of operators. It can be implemented with appropriate protocols between the service-layer elements and the packet-network edge elements. Using the architecture, highly automated, low-cost, efficient, and reliable VoIP services can then be realized through dynamic VTG management that fully exploits the benefits offered by the IP technology.

The invention can be implemented in the context of optical or non-optical networks such as all electrical networks and hybrid optical/electrical networks. It can also be implemented in the context of managed IP networks, where a managed IP network is one that is engineered and managed so that it provides a degree of QoS beyond basic connectivity.

Although the present invention has been described primarily using examples associated with VoIP, it is applicable to other QoS-sensitive applications as well, including interactive video and high-availability email and file-transfer services.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, are recited in a particular sequence with corresponding labeling, unless the claim recitations otherwise imply a particular sequence for implementing some or all of those steps, those steps are not necessarily intended to be limited to being implemented in that particular sequence.

We claim:

1. A packet network comprising:
   a set of packet-switching nodes interconnected by communication links;
   a plurality of media switches (MSWs); and
   at least first and second connection resource managers (CRMs) that overlay a logical circuit-switched network onto at least a subset of the set of packet-switching nodes and corresponding communication links, which logical circuit-switched network provides transport for quality-of-service (QoS)-sensitive demands within the packet network, wherein:
   the logical circuit-switched network provides a guaranteed QoS to demands it carries;
   the logical circuit-switched network comprises a plurality of input virtual trunk groups (VTGs) and a plurality of output VTGs;
   each MSW is operatively coupled between two or more input VTGs and two or more output VTGs;
   the first CRM manages resources associated with at least one input VTG;
   the second CRM manages resources associated with at least one output VTG;
   each MSW multiplexes demands from two or more input VTGs to one or more output VTGs; and
   at least one MSW is operatively coupled to at least a first and a second input VTG and at least one output VTG and the at least one MSW multiplexes demands from the first and second input VTGs into the output VTG, wherein:
   the first input VTG couples a first media gateway (MGW) to the MSW;
   the second input VTG couples a second MGW to the MSW; and
   the output VTG couples the MSW to one other MSW in the packet network.

2. The invention of claim 1, wherein each VTG corresponds to a path within the packet network interconnecting two of the nodes.

3. The invention of claim 2, wherein each VTG has at least one of a guaranteed bandwidth, a guaranteed upper bound on jitter, a guaranteed probabilistic upper bound on jitter, a guaranteed upper bound on packet delay, a guaranteed probabilistic upper bound on packet delay, and a guaranteed upper bound on packet loss ratio.

4. The invention of claim 2, wherein each VTG has a guaranteed bandwidth, a guaranteed upper bound on jitter, a guaranteed upper bound on packet delay, and a guaranteed upper bound on packet loss.

5. The invention of claim 2, wherein each VTG has a guaranteed bandwidth, a guaranteed probabilistic upper bound on jitter, a guaranteed probabilistic upper bound on packet delay, and a guaranteed upper bound on packet loss ratio.

6. The invention of claim 2, wherein the network is an Internet protocol (IP) network and at least one of the VTGs is implemented using at least one of a virtual private network (VPN) technology and a source-based routing technology.

7. The invention of claim 2, wherein the network is a multiprotocol label switching (MPLS) enhanced IP network and each VTG is a label-switched path (LSP).

8. The invention of claim 1, wherein the at least first and second CRMs maintain information about each VTG, wherein the information comprises available bandwidth in the VTG.

9. The invention of claim 8, wherein the at least first and second CRMs:
   receive a request for a new QoS-sensitive demand in the packet network, which request specifies a demand bandwidth for the new QoS-sensitive demand;
   select at least one VTG to carry the new QoS-sensitive demand as a function of the available bandwidth for the selected VTG; and
   reduce the available bandwidth for at least the selected VTG based on the demand bandwidth.

10. The invention of claim 9, wherein the selecting comprises comparing the demand bandwidth with the available bandwidth of at least two different VTGs.

11. The invention of claim 9, wherein a series of two or more concatenated VTGs are selected to carry the QoS-sensitive demand.

12. The invention of claim 9, wherein selecting the at least one VTG involves at least one of provisioning a new VTG in the packet network or provisioning more capacity on an existing VTG in the network.

13. The invention of claim 8, wherein the at least first and second CRMs perform a comparison between the available bandwidth of at least one VTG with a lower bandwidth bound for the VTG and request additional capacity for the VTG as a function of at least the result of the comparison.

14. The invention of claim 8, wherein the at least first and second CRMs perform a comparison between the available bandwidth of at least one VTG with an upper bandwidth bound for the VTG and request a release of capacity for the VTG as a function of at least the result of the comparison.

15. The invention of claim 8, wherein the at least first and second CRMs adjust an upper bandwidth bound and a lower bandwidth bound for at least one VTG as a function of QoS requirements related to new demand blocking rates.

16. The invention of claim 1, wherein each MSW demultiplexes demands from one or more input VTGs to two or more output VTGs.

17. The invention of claim 1, wherein each MSW switches at least one demand from at least one input VTG to at least one output VTG.

18. The invention of claim 1, wherein the at least first and second CRMs communicate with the packet network to dynamically reprovision network resources in support of the QoS-sensitive demands.

19. The invention of claim 1, wherein the at least first and second CRMs are implemented using two or more computing elements wherein at least one of the computing elements is located remote from at least one other of the computing elements.

20. The invention of claim 1, wherein the packet network is at least one of a voice-over-Internet-Protocol (VoIP) network, an ATM network, and a frame relay network.

21. The invention of claim 1, further comprising a transport bandwidth controller (TBC) that supports communication between an application services network and the packet network.

22. The invention of claim 21, wherein the at least first and second CRMs process application service requests from the application services network and pass the processed application service requests to the TBC.

23. The invention of claim 21, wherein the application services network is a voice services network.

24. The invention of claim 21, wherein the at least first and second CRMs dynamically manage bandwidth on VTGs by communicating bandwidth allocation and/or deallocation requests to the packet network via the TBC.

25. The invention of claim 1, wherein the logical circuit-switched network spans at least two domains, wherein each domain is of a particular type and each domain type is at least one of the domain types of the group consisting of technology domains and administrative domains.

26. The invention of claim 1, wherein the logical circuit-switched network spans at least two domains and the at least first and second CRMs comprise at least two border CRMs (B-CRMs), wherein the B-CRMs coordinate management of network resources between the domains.

27. A packet network comprising:
a set of packet-switching nodes interconnected by communication links;
at least one connection resource manager (CRM) adapted to overlay a logical circuit-switched network onto at least a subset of the set of packet-switching nodes and corresponding communication links, which logical circuit-switched network provides transport for quality-of-service (QoS)-sensitive demands within the packet network, wherein:
the logical circuit-switched network provides a guaranteed QoS to demands it carries; and
the logical circuit-switched network comprises one or more virtual trunk groups (VTGs); and
a plurality of media switches (MSWs), each MSW operatively coupled between a plurality of input VTGs and a plurality of output VTGs and each MSW is adapted to multiplex demands from two or more of the plurality of input VTGs to one or more of the plurality of output VTGs, wherein:
at least one MSW is operatively coupled to at least a first and a second input VTG and at least one output VTG and the at least one MSW is adapted to multiplex demands from the first and second input VTGs into the output VTG, wherein:
the first input VTG couples a first media gateway (MGW) to the MSW;
the second input VTG couples a second MGW to the MSW; and
the output VTG couples the MSW to one other MSW in the packet network;
the at least one CRM comprises a first CRM and a second CRM, wherein:
the first CRM manages resources associated with at least the first input VTG; and
the second CRM manages resources associated with at least the output VTG.

28. A packet network comprising:
a set of packet-switching nodes interconnected by communication links;
at least one connection resource manager (CRM) adapted to overlay a logical circuit-switched network onto at least a subset of the set of packet-switching nodes and corresponding communication links, which logical circuit-switched network provides transport for quality-of-service (QoS)-sensitive demands within the packet network, wherein:
the logical circuit-switched network provides a guaranteed QoS to demands it carries; and
the logical circuit-switched network comprises one or more virtual trunk groups (VTGs); and
a plurality of media switches (MSWs), each MSW operatively coupled between a plurality of input VTGs and a plurality of output VTGs and each MSW is adapted to multiplex demands from two or more of the plurality of input VTGs to one or more of the plurality of output VTGs, wherein:
two or more of the MSWs are core MSWs (C-MSW), wherein C-MSWs can include all of the functionality of MSWs and at least one of the C-MSWs is operatively coupled to at least a first and a second input VTG and at least one output VTG is adapted to multiplex demands from at least the first and second input VTGs, wherein:
the first input VTG couples a first MSW to the C-MSW;
the second input VTG couples either a second MSW or a MGW to the C-MSW; and
the output VTG couples the C-MSW to at least one other C-MSW in the packet network; and
the at least one CRM comprises a first CRM and a second CRM, wherein:
the first CRM manages resources associated with at least the first input VTG; and
the second CRM manages resources associated with at least the output VTG.

29. A packet network comprising:
a set of packet-switching nodes interconnected by communication links;
a plurality of media switches (MSWs); and
at least first and second connection resource managers (CRMs) that overlay a logical circuit-switched network onto at least a subset of the set of packet-switching nodes and corresponding communication links, which logical circuit-switched network provides transport for quality-of-service (QoS)-sensitive demands within the packet network, wherein:
the logical circuit-switched network provides a guaranteed QoS to demands it carries;
the logical circuit-switched network comprises a plurality of input virtual trunk groups (VTGs) and a plurality of output VTGs;
each MSW is operatively coupled between two or more input VTGs and two or more output VTGs;
the first CRM manages resources associated with at least one input VTG;
the second CRM manages resources associated with at least one output VTG;
each MSW multiplexes demands from two or more input VTGs to one or more output VTGs; and
two or more of the MSWs are core MSWs (C-MSW), wherein C-MSWs can include all of the functionality of MSWs and at least one of the C-MSWs is operatively coupled to at least a first and a second input VTG and at least one output VTG multiplexes demands from at least the first and second input VTGs, wherein:
the first input VTG couples a first MSW to the C-MSW;
the second input VTG couples either a second MSW or a MGW to the C-MSW; and
the output VTG couples the C-MSW to at least one other C-MSW in the packet network.

* * * * *

UNITED STATES PATENT AND TRADEMARK OFFICE
CERTIFICATE OF CORRECTION

| | | |
|---|---|---|
| PATENT NO. | : 7,609,637 B2 | Page 1 of 1 |
| APPLICATION NO. | : 10/817671 | |
| DATED | : October 27, 2009 | |
| INVENTOR(S) | : Doshi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1548 days.

Signed and Sealed this

Twelfth Day of October, 2010

David J. Kappos
*Director of the United States Patent and Trademark Office*